United States Patent [19]
Kubota et al.

[11] Patent Number: 6,157,430
[45] Date of Patent: *Dec. 5, 2000

[54] ACTIVE MATRIX LIQUID CRYSTAL DEVICE INCLUDING BRUSH-CLEARABLE MULTIPLE LAYER ELECTRODES AND A METHOD OF MANUFACTURING THE SAME

[75] Inventors: Takeshi Kubota; Masami Hayashi, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/939,709

[22] Filed: Sep. 29, 1997

[30] Foreign Application Priority Data

Mar. 24, 1997 [JP] Japan ................................ 9-69553

[51] Int. Cl.[7] ............................. G02F 1/136; G02F 1/13
[52] U.S. Cl. ............................ 349/147; 349/43; 349/187
[58] Field of Search ........................... 349/43, 147, 187, 349/139, 42; 257/59

[56] References Cited

U.S. PATENT DOCUMENTS

| | | | |
|---|---|---|---|
| 5,153,754 | 10/1992 | Whetten | 349/147 |
| 5,334,860 | 8/1994 | Naito | 257/59 |
| 5,667,921 | 9/1997 | Takayanagi | 430/7 |
| 5,831,283 | 11/1998 | Batey et al. | 257/66 |

FOREIGN PATENT DOCUMENTS

| | | | |
|---|---|---|---|
| 58-222533A | 12/1983 | Japan | 349/148 |
| 4-239729 | 8/1992 | Japan . | |
| 5-67783 | 3/1993 | Japan . | |
| 5-203989 | 8/1993 | Japan . | |

Primary Examiner—James A. Dudek
Assistant Examiner—Toan Ton
Attorney, Agent, or Firm—Oblon, Spivak, McClelland, Maier & Neustadt, P.C.

[57] ABSTRACT

A manufacturing method of a liquid crystal display device including a step of:

forming a first mask film; cleaning a surface of the first mask film with a brush; patterning the first mask film into a first mask layer comprising a cover pattern covering a first line pattern of the gate electrode and the gate electrode line, on the gate electrode and the gate electrode line; etching a defect portion in the first line pattern; and removing the first mask layer.

12 Claims, 16 Drawing Sheets

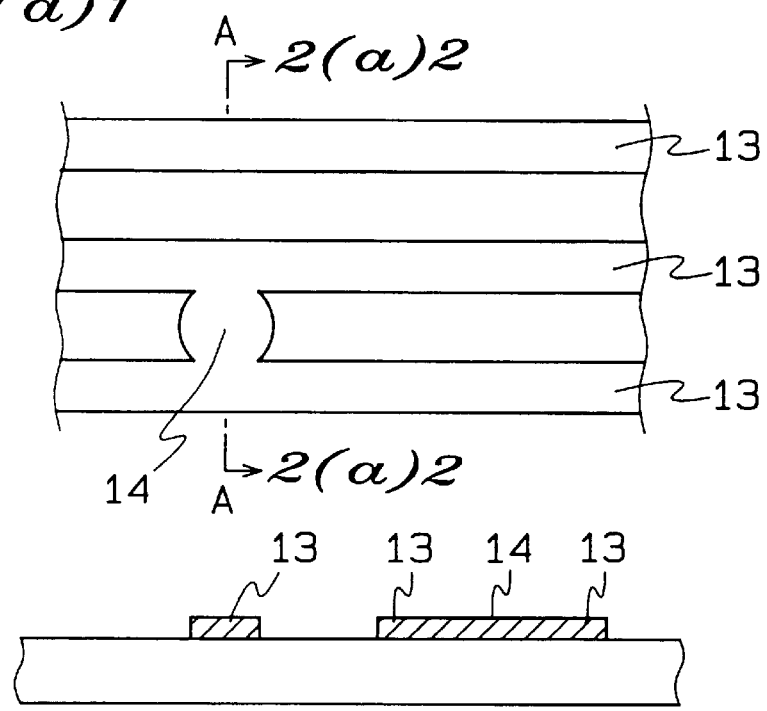
FIG.2(a)1
FIG.2(a)2
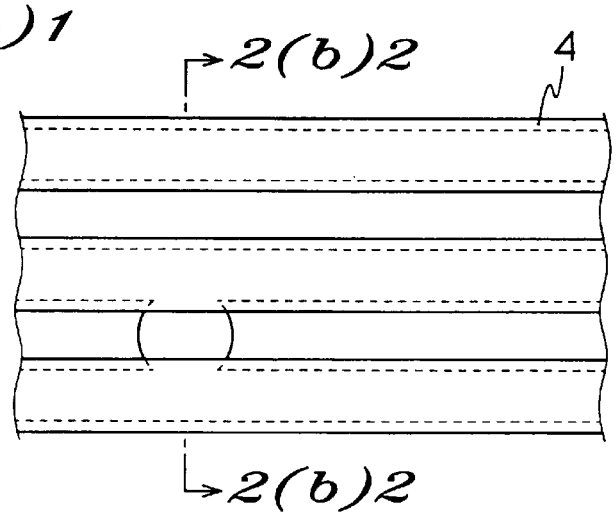
FIG.2(b)1
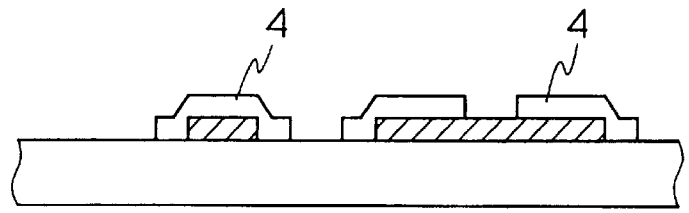
FIG.2(b)2

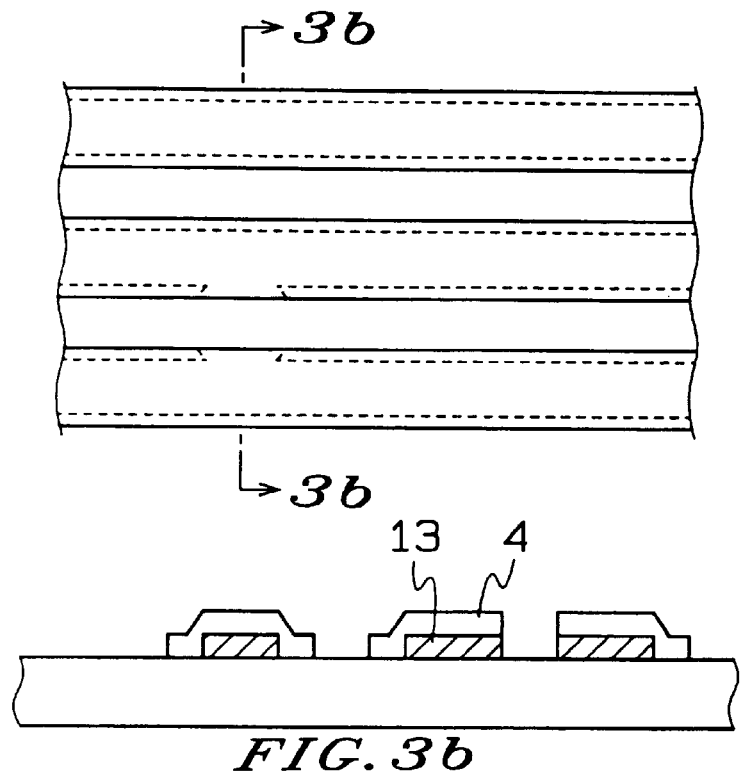
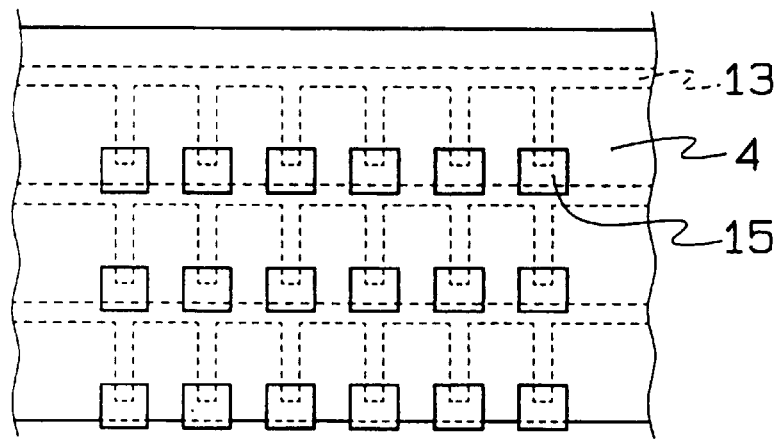

(PRIOR ART)

ACTIVE MATRIX LIQUID CRYSTAL DEVICE INCLUDING BRUSH-CLEARABLE MULTIPLE LAYER ELECTRODES AND A METHOD OF MANUFACTURING THE SAME

BACKGROUND OF THE INVENTION

The present invention relates to an active matrix liquid crystal display device on which a thin film transistor (hereinafter referred to as TFT) is provided as a switching element, and a manufacturing method therefor.

FIGS. 17(a) to 17(d) are cross-sectional views showing the manufacturing process of the TFT array substrate on which a conventional TFT of the TFT liquid crystal display device having a low resistance signal line. In the drawing, reference numeral 1 shows a transparent insulating substrate such as a glass substrate, numeral 2 shows a gate line provided with a gate electrode on a transparent insulating substrate 1, numeral 3 shows a common line, numeral 5 shows a gate insulating film formed on the gate line 2, numeral 6 shows a semiconductor layer formed on the gate electrode 2 through an insulating film 5, numeral 7 shows an ohmic contact layer formed on the semiconductor layer 6, numeral 8 shows a pixel electrode, numerals 10 and 11 show a source electrode and a drain electrode formed on the ohmic contact layer 7, and numeral 12 shows a passivation film.

There is explained a manufacturing method for a TFT array substrate on which a conventional TFT is provided. First, as shown in FIG. 17(a), a single layer film of a metal having small specific resistance such as Al or Al alloy is formed on the surface of a transparent insulating substrate 1, thereafter patterning is made by using a photoresist film (hereinafter referred to as a resist) formed by photolithography to form a gate line 2 and common line 3. As shown in FIG. 17(b), there are continuously formed by plasma enhanced chemical vapor deposition (plasma CVD) a silicon nitride film which is to become a gate insulating film 5, and amorphous silicon film, impurity-doped $n^+$ type amorphous silicon film. Thereafter, using a resist formed by photolithography, amorphous silicon film and $n^+$ type amorphous silicon film are simultaneously patterned, and then on the position above the gate line 2, a semiconductor layer 6 and an ohmic contact layer 7 are formed.

As shown in FIG. 17(c), as a transparent conductive film there is formed an indium tin oxide (ITO) film, thereafter patterning is performed by using a resist by photolithography to form a pixel electrode 8. Next, on the ohmic contact layer 7, a source electrode 10 and a drain electrode 11 are formed. Here, the source electrode 10 and a drain electrode 11 are formed as two layers structure of film having as a lower layer a film of chromium (Cr) or titanium (Ti) as a barrier metal for improving the ohmic contact characteristics with $n^+$ type amorphous silicon film, and as an upper layer a film comprising aluminum (Al) or Al alloy having small specific resistance due to low resistance. Alternatively, there may be cases where tungsten or the like is added as an Al alloy in order to prevent the Al film and indium tin oxide (ITO) film constituting a pixel electrode 8 which is to become an under layer from galvanic corrosion in the developing solution. As shown in FIG. 17(d), a silicon nitride is formed into a film to form a passivation film 12.

As described above, in order to obtain a liquid crystal display device of low power consumption, in case a signal line of low resistance is constituted of a single layer film made of Al film or Al alloy film, or a multilayered film including an Al type metal film on the surface layer, because the Al type metal is soft, when it is strongly cleaned with a brush or the like, scratches are formed on the film surface. For this reason, in forming a resist for patterning the Al type metal film, cleaning may be performed by jetting pure water or supersonic cleaning, but no cleaning with a brush can be performed. As a result, sufficient removal of dust on the film surface is not attained, dust and resist which remained around the dust form masks, the Al metal films remaining on those portions are not etched to remain, and short circuit occurs to give lower yield. Also, in case of forming a signal line made of a metal film made of Cr, Ti, tantalum (Ta) or molybdenum (Mo), or alloy thereof other than the Al film containing these metals, or in forming a signal line made of a metal having relatively high hardness such as an alloy film other than Al alloy containing these metals, etch residue of metal film occurs though in a small degree by the dust which has not been completely removed by cleaning with a brush (brush cleaning) or by the dust which deposited after the cleaning, leading to lowering of yield.

The present invention has been made to solve the problems as above, and its object is to provide a method for manufacturing a low power consumption liquid crystal display device at high yield by making high aperture ratio, by preventing lowering yield caused by short circuit between the lines, and by manufacturing the fine pattern lines by forming a signal by line using the material having relatively small specific resistance.

SUMMARY OF THE INVENTION

According to the present invention, there is provided a manufacturing method of a liquid crystal display device comprising steps of:

(a) depositing a metal film on a transparent insulting substrate; and
patterning the metal film to form a gate electrode, a gate electrode line and a common line, (b) forming a first mask film;
cleaning a surface of the first mask film with a brush;
patterning the first mask film into a first mask layer comprising a cover pattern covering a first line pattern of the gate electrode and the gate electrode line, on the gate electrode and the gate electrode line;
etching a defect portion in the first line pattern; and
removing the first mask layer, (c) forming an insulating film and semiconductor films, on the gate electrode, the gate electrode line and the common line; and
patterning the semiconductor films to form a semiconductor layer and an ohmic contact layer, (d) depositing a transparent conductive film; and
patterning the transparent conductive film to form a pixel electrode, on the insulating film and the ohmic contact layer, (e) forming a first electrode, a first electrode line and a second electrode, on the ohmic contact layer, (f) forming a passivation film to obtain a first substrate, on the first electrode, the first electrode line and the second electrode line, (g) forming a light shield layer, an overcoat layer, an opposite electrode and an alignment layer, on a second substrate of another transparent insulating substrate, (h) opposing the second substrate to the first substrate;
injecting a liquid crystal material between the first substrate and second substrate; and
providing polarizers both outside of the first and second substrates.

Preferably, the first mask layer comprises a material resistant to an etchant for the gate electrode and the gate electrode line.

Preferably, the first mask layer has a pattern in which at least one opening is provided in at least one portion in the first line pattern.

Preferably, the gate electrode, the gate electrode line and the common line are made of one member selected from a group comprising a single layer of aluminum film, a single layer of aluminum alloy film and a multilayer film including aluminum type metal film.

Preferably, a surface layer of the multilayer film is made of a metal having a higher hardness than aluminum.

Preferably, the metal having a higher hardness than aluminum is one member selcted from a group comprising chromium, titanium, tantalum, molybdenum and an alloy thereof except for aluminum alloy.

Preferably, the step (f) further includes a step of forming a second mask layer comprising a cover pattern covering a second line pattern of the first electrode, the first electrode line and the second electrode, on the first electrode, a first electrode line and the second electrode;

etching a defect portion in the second line pattern; and removing the second mask layer.

Preferably, the first electrode, a first electrode line and second electrode comprise at least three layers of film, and wherein a surface layer of the three layers of film comprises a metal with a high hardness.

Preferably, the metal with a high hardness is one having such a hardness that cleaning with a brush causes no scratch.

Preferably, the metal with a high hardness is selected from a group comprising a metal capable of being etched by a same etchant as one for the aluminum alloy, and a metal capable of being etched by an etching gas.

Preferably, etching condition is determined so that the film of the metal with a high hardness is etched faster than the aluminum alloy.

Preferably, the etching a defect portion is performed by one member selected from a group comprising a wet etching method and a dry etching method.

Preferably, in dry etching oxygen gas is included into an etching gas for the dry etching method.

According to the present invention, there is provided a manufacturing method of a liquid crystal display device comprising steps of:

(a) depositing a metal film on a transparent insulating substrate;

patterning the film to form a gate electrode and a gate electrode line; forming a photoresist film on portions between two gate electrode lines; and performing an anodic oxidation for a part of the gate electrode line, the photoresist film being not formed on the part, (b) forming a first mask layer comprising a cover pattern covering a first line pattern of the gate electrode and the gate electrode line, on the gate electrode and the gate electrode line;

etching a defect portion in the first line pattern; and removing the first mask layer, (c) forming an insulating film and semiconductor films, on the gate electrode, the gate electrode line and the common line and, patterning the semiconductor films to form a semiconductor layer and on ohmicconduct layer, (d) depositing a transparent conductive film; and patterning the transparent conductive film to form a pixel electrode, on the insulating film and the ohmic contact layer, (e) forming a first electrode, a first electrode line and a second electrode, on the ohmic contact layer; and forming a passivation film on the first electrode and the second electrode, (f) removing one portion of the insulating film and the passivation film between two gate electrode lines; and etching a short-circuited portion uncovered with the insulating film and the passivation film, (g) forming a light shield layer, an overcoat layer, an opposite electrode and an alignment layer, on a second substrate of another transparent insulating substrate, (h) opposing the second substrate to the first substrate; injecting a liquid crystal material between the first substrate and second substrate; and providing polarizers both outside of the first and second substrates.

Preferably, in step (f) the one portion of the insulating film and the passivation film is removed in one process.

Preferably, the etching a defect portion is performed by one member selected from a group comprising a wet etching method and a dry etching method.

According to the present invention, there is provided a liquid crystal display device comprising a first substrate, a second substrate opposed to the first substrate, and a liquid crystal interposed between the first substrate and the second substrate, wherein the first substrate is transparent insulating substrate, wherein a gate electrode and a gate electrode line are provided on the first substrate, wherein an insulating film is provided over the gate electrode and gate electrode line, a semiconductor layer provided on the insulating film, wherein a first electrode, a first electrode line and a second electrode are provided over the semiconductor layer, wherein a pixel electrode is connected electrically to the second electrode, and wherein a passivation film is provided over the first electrode, the first electrode line, the second electrode and the pixel electrode, wherein the gate electrode and the gate electrode line are formed by depositing one lower metal film made of one member selected from a group comprising Al and Al alloy and another upper metal film having high hardness to endure brush cleaning to form a two layers of film and by cleaning a surface of the two layers of film and by etching the two layers of film, wherein the first electrode, the first electrode line and the second electrode constitute a semiconductor device, wherein the pixel electrode includes a transparent conductive film connected electrically with the second electrode, and wherein a part on the pixel electrode of the passivation film is removed.

Preferably, the upper metal film is made of one member selected from a group comprising chromium, titanium, tantalum, molybdenum and an alloy thereof except for aluminum alloy.

Preferably, the first electrode, a first electrode line and second electrode comprise at least three layers of film; a surface layer of the three layers of film comprises a metal with a high hardness.

Preferably, an anodic oxidation is performed for a part of the gate electorde.

BRIEF EXPLANATION OF THE DRAWINGS

FIGS. 2(a) and 2(b) are views illustrating a process according to Embodiment 1 of the present invention;

FIGS. 3(a) and 3(b) are views illustrating a process according to Embodiment 1 of the present invention;

FIG. 4 is a view illustrating a process according to Embodiment 1 of the present invention;

DETAILED DESCRIPTION

Embodiment 1

Figure 1A:
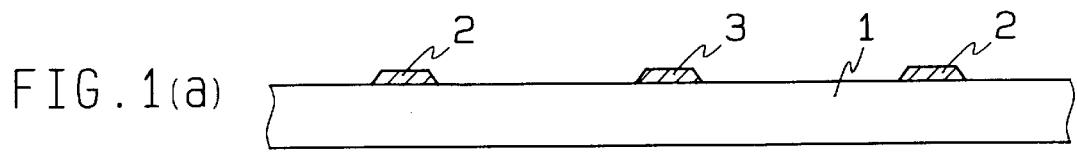
FIGS. 1(a) to 1(g) are sectional views showing steps for manufacturing a TFT array substrate of a liquid crystal display device according to Embodiment 1 of the present invention.

Hereinafter, a method of manufacturing a liquid crystal display device on which a TFT is provided according to an embodiment of the present invention is illustrated referring to the drawings. FIGS. 1(a) to 1(g) are sectional views showing steps for manufacturing a TFT array substrate of a liquid crystal display device on which a channel-etched TFT is provided according to Embodiment 1 of the present invention. In the drawings, reference numeral 1 shows a transparent insulating substrate (a first substrate) such as a glass substrate, numeral 2 shows a gate electrode line (in this embodiment, a gate line) having a gate electrode (in this embodiment, a gate electrode) formed on the transparent insulating substrate 1, numeral 3 shows a common line formed on the transparent insulating substrate 1, simultaneously with the gate line, numeral 4 shows a mask layer formed on the gate line 2 and common line 3, numeral 5 shows an insulating film formed on the mask layer 4 (in this embodiment, a gate insulating film), numeral 6 shows a semiconductor layer formed on the gate line 2 through a gate insulating film 5, numeral 7 shows an ohmic contact layer formed on the semiconductor layer 6, numeral 8 shows a pixel electrode, numeral 9 shows a metal film, numeral 10 and 11 are a first electrode and a second electrode (in this embodiment, a source electrode and a drain electrode) having a first electrode line (in this embodiment, a source line) formed on the ohmic contact layer 7 by patterning the metal film 9, and numeral 12 shows a passivation layer.

There is illustrated a method for manufacturing a TFT array substrate of a liquid crystal display device according to this embodiment. First, as shown in FIG. 1(a), a metal film having small specific resistance such as Al containing 0.2 atomic % copper (Cu) (hereinafter to be described as Al-0.2 at % Cu) is deposited on the surface of the transparent insulating substrate 1 to about 200 nm in thickness by sputtering. Thereafter a resist is formed by photolithographic techniques, and pattern etching is made by using an etchant comprising phosphoric acid, acetic acid and nitric acid as main components to form a gate electrode, a gate line 2 and a common line 3 and then the resist is removed. In this case, for the etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film to tapered shape, the coverage of the film to be formed on the upper layer can be improved.

Figure 1B:
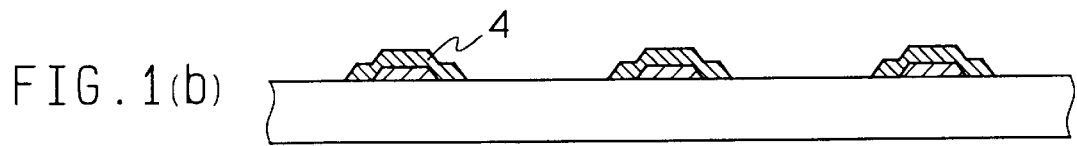

As shown in FIG. 1(b), for example, Cr film is deposited to about 200 nm in thickness by sputtering; its surface is cleaned with a brush; then a photoresist (resist) film is applied; the resist is patterned to a configuration with which the line pattern of Al-0.2 at % Cu film such as a gate line 2 and a common line 3 is covered; thereafter an exposed Cr film is removed by etching to form a mask layer 4. Thereafter, the resist is removed, and the TFT array substrate in process of manufacturing is dipped in an etchant comprising phosphoric acid, acetic acid and nitric acid as the main components for a duration necessary for the Al-0.2 at % Cu film of about 200 nm to be etched to remove the etch residue such as short-circuited portion between the lines in the pattern made of Al-0.2 at % Cu film.

A process wherein a pattern defect portion i.e., the short circuit defects occurred between the lines such as a gate line 2 are removed is illustrated referring to FIGS. 2(a), 2(b), 3(a), and 3(b). In case in which a short-circuited defective portion 14 is occurred between the lines 13 such as a gate line, source line (FIG. 2(a)), as shown in FIG. 2(b), a mask layer 4 is formed into a cover pattern covering the lines 13, and then, a substrate on which a mask layer 4 is formed is dipped in the etchant which can etch the line 13, by which, as shown in FIGS. 3(a) and 3(b), the short-circuited defective portion 14 not covered with the mask layer 4 is removed by etching.

The mask layer 4 may be of a configuration having openings 15 only on the part where the lines 13 in the line pattern are disposed nearby to each other, since the above-mentioned part is liable to cause a short circuit defect, as shown in FIG. 4.

Figure 1C:
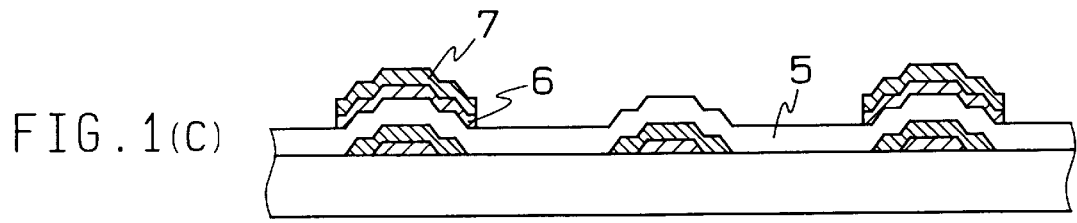
Figure 1D:
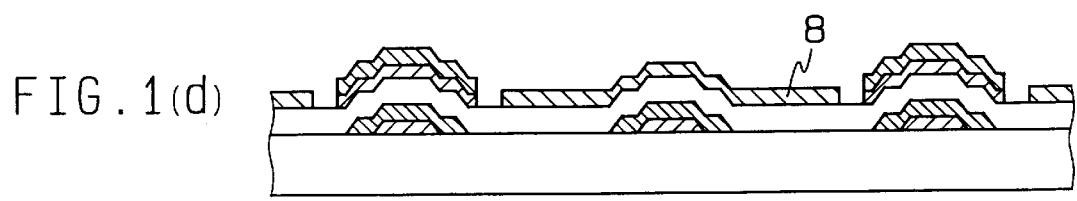

As shown in FIG. 1(c), by plasma CVD and the like, there were sequentially formed about 500 nm in thickness of silicon oxide film to become a gate insulating film 5, about 200 nm in thickness of amorphous silicon film, and about 50 nm in thickness of n+ type amorphous silicon film doped with impurities, thereafter an amorphous silicon film and n+ type amorphous silicon film are simultaneously patterned by using a resist formed by photolithographic techniques, to form a semiconductor layer 6 and an ohmic contact layer 7 on the position above the gate line 2. As shown in FIG. 1(d), as a transparent conductive film, an ITO film is deposited by about 100 nm in thickness by sputtering, thereafter patterning is made by using another resist formed by photolithography to form a pixel electrode 8.

Figure 1E:
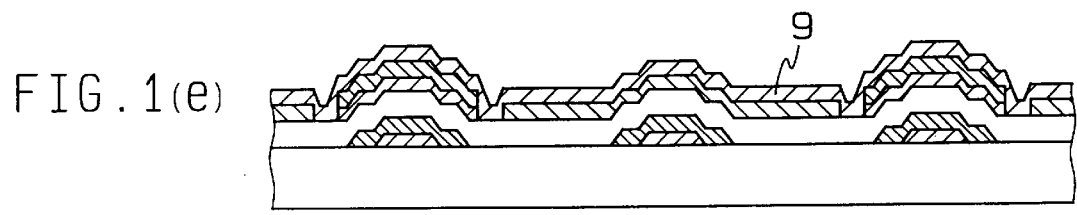
Figure 1F:
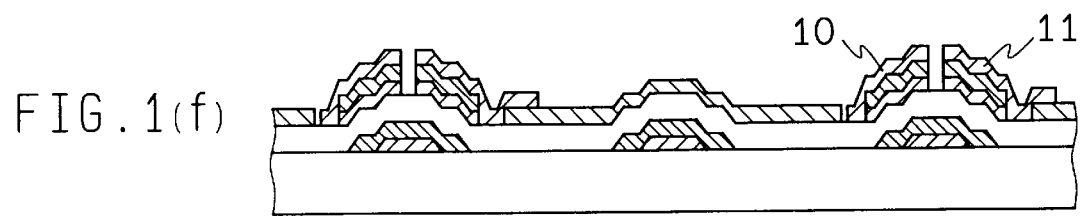
Figure 1G:
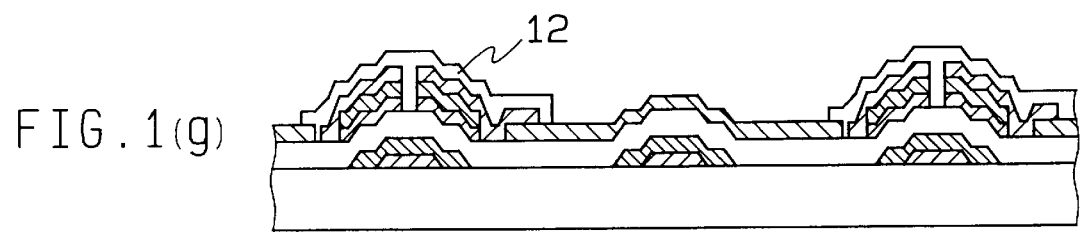

As shown in FIG. 1(e), there are continuously formed about 100 nm in thickness of high melting point metal film made of Cr or Ti which has a good ohmic contact property to the n+ type amorphous silicon film which constitutes the ohmic contact layer 7 as a bottom layer, about 300 nm in thickness of Al-0.2 at % Cu having small specific resistance as an intermediate layer, and about 50 nm in thickness of Cr film which has high hardness of 130 of Vickers hardness to endure cleaning with a brush as a top layer, to form a metal film 9 comprising the three layered film, followed by brush cleaning. Continuously, as shown in FIG. 1(f), using an etching resist formed by photolithographic techniques, the metal film 9 is patterned, and the source electrode 10 and the drain electrode 11 which are separated to two parts are formed on the source line and ohmic contact layer 7. Continuously, by means of a dry etching process, an n+ amorphous silicon film (ohmic contact layer 9) portion in which the source electrode 10 and drain electrode 11 are removed is etched to form a channel part, thereafter the resist is removed. As shown in FIG. 1(g), the silicon nitride film is deposited to form a passivation film 12 on the portion other than on the pixel electrode 8.

Thus formed first substrate of TFT array substrate and the opposite substrate (a second substrate) wherein a light shield layer, an overcoat layer and an opposite electrode are formed on another transparent insulating substrate, on the surface of which an alignment film is formed, and the two substrates are oppositely disposed, and a liquid crystal is injected in the gap between them to seal in with a sealing agent, and polarizers are disposed on the outside of the TFT array substrate and on the outside of the opposite substrate to fabricate a liquid crystal panel.

Although an Al-0.2 at % Cu film is used as a material for the gate line 2, an Al film or Al alloy film of other composition (containing more than 90 at % of Al) may be provided if the film has small specific resistance and is free from corrosion caused by water and hillock caused by thermal history.

As a mask layer 4, a Cr film is used, but unless the film is eroded by the etchant for the Al alloy film, other metal film such as tungsten film may be used. Alternatively, as a method of etching the etch residue of Al alloy film, a dry etching method may be employed in place of the wet etching method.

Through the above-mentioned steps of manufacturing method of a liquid crystal display device, there was not observed a short circuit defect between the lines which had frequently occurred in the case of using an Al type metal film for the gate line 2, and in the source line the pattern defects decreased by carrying out the brush cleaning.

According to this invention, even in case of constituting the line 13 (gate line 2) by using a single layer film by Al film or Al alloy film or a multilayer film having Al type metal film as the surface layer for making the signal line having low resistance, the line 13 may be covered with the mask layer 4 or the like to remove securely the short circuit defect 14 between the lines 13. Further, a metal layer having high hardness is formed on the surface layer of the line 13 (source line), which is cleaned with a brush, thereafter a resist is formed and patterned, by which the short circuit between the lines 13 can be prevented. Also, by constituting the signal line with the material having small specific resistance, the pattern can be formed as fine lines, and by making at high aperture ratio a liquid crystal display device of low power consumption can be produced in high yield.

Embodiment 2

FIGS. 5(a) to 5(h) are sectional views showing a step for manufacturing a TFT array substrate of a liquid crystal display device on which a channel protection film type TFT according to Embodiment 2 of the present invention is provided. In the drawings, reference numeral 16 shows a metal film, numeral 17 shows a resist pattern film used for forming a metal film 16, numeral 18 shows a channel passivation film, and numeral 19 shows a semiconductor layer. The parts same as those shown in FIGS. 1(a) to 1(g) are indicated with the same reference numerals and explanation thereof omitted.

Figure 5A:
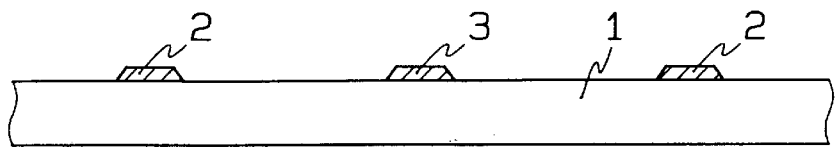
FIGS. 5(a) to 5(h) are sectional views showing steps for manufacturing a TFT array substrate of a liquid crystal display device according to Embodiment 2 of the present invention.

A method of manufacturing a TFT array substrate of a liquid crystal display device according to this embodiment is illustrated. First, as shown in FIG. 5(a), a metal film having small specific resistance such as Al-0.2 at % Cu is deposited on the surface of the transparent insulating substrate 1 to about 200 nm in thickness by sputtering, thereafter a resist is formed by photolithographic techniques, and pattern etching is made by using en etchant comprising phosphoric acid, acetic acid and nitric acid as main components to form a gate line 2 and a common line 3 having gate electrodes, and then the resist is removed. In this case, for etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film into tapered shape, the coverage of the film to be formed on the upper layer can be improved.

Figure 5B:
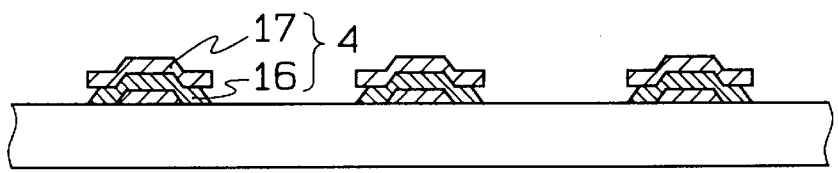

As shown in FIG. 5(b), for example, Cr film is deposited to about 100 nm in thickness by sputtering; its surface is cleaned with a brush; then a resist is applied. Further, the resist pattern film 17 is formed into a configuration with which the line pattern of Al-0.2 at % Cu film such as the gate line 2 and a common line 3 is covered; thereafter an exposed Cr film is removed by etching to form a mask layer 4 comprising a metal film 16 of Cr film and a resist pattern film 17. Thereafter, the resist is removed, and the TFT array substrate in manufacturing process is dipped in an etchant comprising phosphoric acid, acetic acid and nitric acid as the main components for a duration necessary for the Al-0.2 at % Cu film of about 200 nm in thickness to remove the etch residue such as short-circuited portion between the lines in the line pattern made of Al-0.2 at % Cu film, thereafter the resist pattern film 17 constituting the mask layer 4 is removed.

Figure 5C:
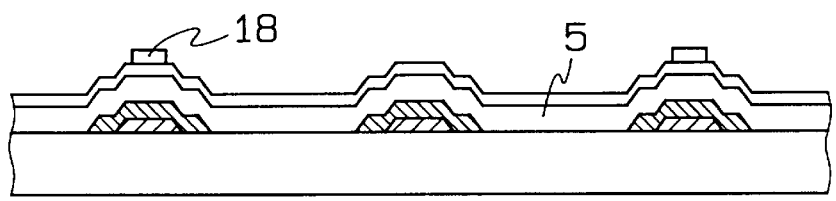
Figure 5D:
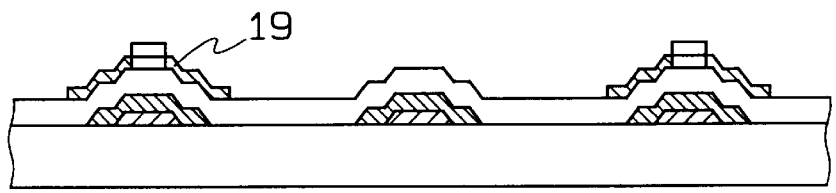
Figure 5E:
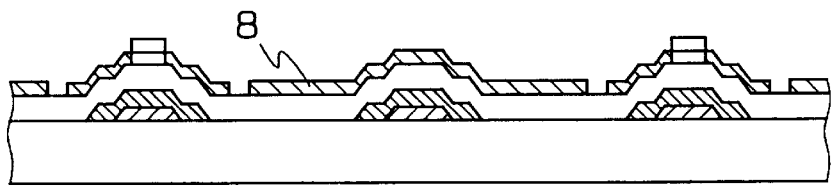

As shown in FIG. 5(c), by plasma CVD and the like, there were sequentially formed about 500 nm in thickness of silicon oxide film to become a gate insulating film 5, about 100 nm in thickness of amorphous silicon film, and about 250 nm in thickness of a channel passivation film 18, thereafter patterning is made with a resist formed by photolithographic techniques, to form a channel passivation film 18 on the position above the gate line 2. Continuously, a phosphorus ion is implanted in an amorphous silicon film at an acceleration voltage of for example 20 keV to form an n+ type amorphous silicon layer. As shown in FIG. 5(d), an n+ type amorphous silicon layer formed by an amorphous silicon film and implantation of phosphorus ion is patterned to form a semiconductor layer 19 having an ohmic contact layer on the surface. As shown in FIG. 5(e), as a transparent conductive film, an ITO film is deposited by about 100 nm in thickness by sputtering, thereafter patterning is made by using another resist formed by photolithography, to form a pixel electrode 8.

Figure 5F:
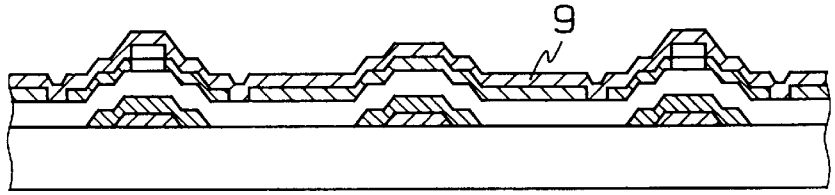
Figure 5G:
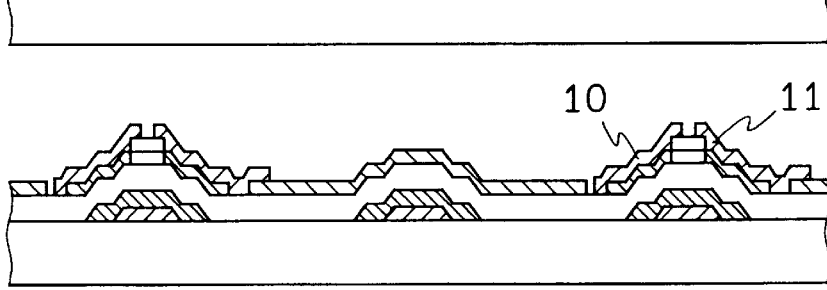
Figure 5H:
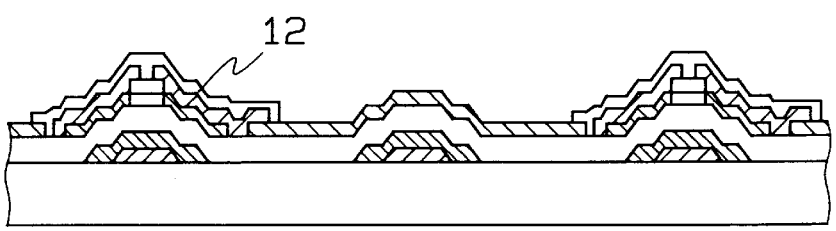

As shown in FIG. 5(f), there are continuously formed about 100 nm in thickness of Cr or Ti which has good ohmic contact property to the semiconductor layer 19 as the bottom layer, about 300 nm in thickness of Al-0.2 at % Cu having small specific resistance as the intermediate layer, and about 50 nm in thickness of Cr which has high hardness to endure cleaning with a brush on the top layer, to form a metal film 9 comprising the three layers of film, followed by brush cleaning. Continuously, as shown in FIG. 5(g), using an etching resist formed by photolithographic techniques, the metal film 9 is patterned to form a first electrode line (in this embodiment, source electrode), and a first electrode and a second electrode (in this embodiment, source electrode 10 and drain electrode 11) which are separated to two parts are formed on the semiconductor layer 19. Continuously, by means of dry etching, a chrome silicide layer and an n+ amorphous silicon layer formed on the portions in which the source electrode 10 and drain electrode 11 are removed are etched, thereafter the resist is removed. As shown in FIG. 5(h), the silicon nitride film is deposited to form a passivation film 12 on the portion other than on the pixel electrode 8.

Thus formed first substrate of TFT array substrate and the opposite substrate which is the second substrate wherein a light shield layer, an overcoat layer and an opposite electrode are formed on other transparent insulating substrate, on the surface of which an alignment film is formed, and the two substrates are oppositely disposed, and a liquid crystal is injected in the gap between them to seal in with a sealing agent, and polarizers are disposed on the outside of the TFT array substrate and on the outside of the opposite substrate to constitute a liquid crystal panel.

Although an Al-0.2 at % Cu film is used as a material for the gate line 2, an Al film or Al alloy film of other composition can be used if the film has small specific resistance and is free from corrosion caused by water and hillock caused by thermal history.

As a metal film 16, a Cr film is used, but if the film is not eroded by the etchant to the Al alloy film, other metal film such as tungsten film can be used. Alternatively, as a method of etching the etch residue by Al alloy film, dry etching method can be employed in place of the wet etching method.

According to this embodiment, in a liquid crystal display device on which a channel-passivated TFT is provided, the same effect as that of Embodiment 1 is obtained. Moreover, in removing the defective portions of short circuit between the lines by covering the line portions of the gate line 2 with a mask layer 4, the mask layer 4 is formed as a two layers film of a metal film 16 of Cr film and a resist pattern film 17 for patterning the metal film 16, by which corrosion of the lines by defective coating of the metal layer 16 can be prevented, and the metal film 16 which constitutes the mask layer 4 can be formed in thinner thickness.

Embodiment 3

In Embodiment 2, description is made on the case where, in a channel-passivated TFT, the mask layer 4 for etching the gate line 2 and the like is formed as a two layers of metal film 16 of Cr film and a resist pattern film 17. However, in a case of a channel-etched TFT the same effect as that of Embodiment 2 is obtained when in etching the line portion such as a gate line, the mask layer is formed as a two layers film of a metal film and a resist pattern film.

Embodiment 4

FIGS. 6(a) to 6(g) and FIGS. 7(a) to 7(d) are the sectional views showing the steps for manufacturing a TFT array substrate of a liquid crystal display device on which a planer TFT according to Embodiment 4 of the present invention is provided. In the drawings, numeral 20 shows an amorphous silicon film, numeral 21 shows a channel, numeral 22 shows a gate line, numeral 23 shows a gate electrode, numeral 24 shows a source-drain region, numeral 25 shows an insulating film, and numeral 26 shows a contact hole. The same parts as those shown in FIGS. 5(a) to 5(h) are indicated with the same reference numerals and explanation thereof is omitted.

Figure 6A:
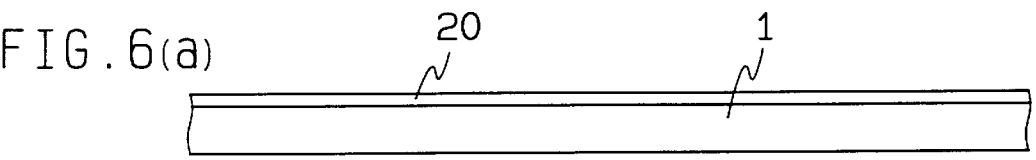
FIGS. 6(a) to 6(g) are views steps for manufacturing a TFT array substrate of a liquid crystal display device according to Embodiment 4 of the present invention.
Figure 6B:
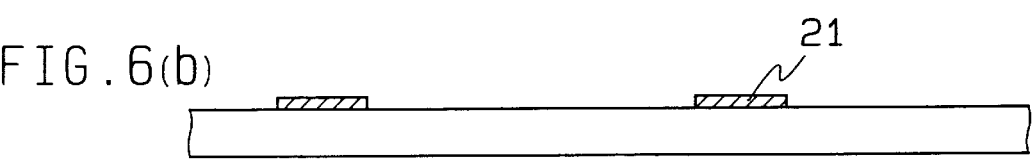
Figure 6C:
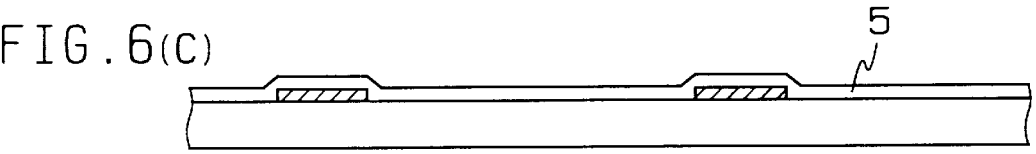

A method of manufacturing the TFT array substrate of a liquid crystal display device according to this embodiment is explained. First, as shown in FIG. 6(a), on a surface of a transparent insulating substrate 1, an amorphous silicon film 20 is formed to about 100 nm by plasma CVD or the like. As shown in FIG. 6(b), laser beams are irradiated to crystallize the amorphous silicon film 20 to polycrystalline silicon. In this case, as a laser, for example, ArF or XeCl excimer laser of a pulse width of 15 to 50 ns is irradiated by power of 100 to 300 mj/cm$^2$. Thereafter, the material is patterned by using a resist formed by photolithographic techniques to form a channel 21. Next, as shown in FIG. 6(c), either silicon oxide film or silicon nitride film is deposited by about 100 nm in thickness by plasma CVD, atmospheric pressure CVD or sputtering to form a gate insulating film 5.

Figure 6D:

As shown in FIG. 6(d), for example, a metal having small specific resistance such as Al-0.2 at % Cu film is deposited to about 200 nm in thickness by sputtering method, thereafter a resist is formed by photolithographic techniques, and pattern etching is made by using an etchant comprising phosphoric acid, acetic acid and nitric acid as main components to form a gate line 22, and then the resist is removed. In this case, for etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film into tapered shape, the coverage of the film to be formed on the upper layer can be improved.

Figure 6E:
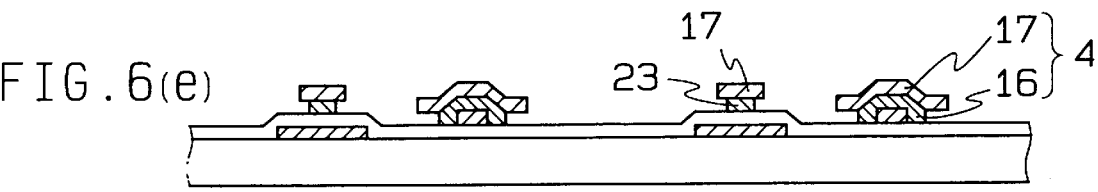

As shown in FIG. 6(e), for example, Cr is deposited to about 100 nm in thickness by sputtering method, its surface is cleaned with a brush, then a resist is applied. Further, an Al-0.2 at % Cu film for constituting the gate line 22 is coated, and a resist pattern film 17 for forming a gate electrode 23 comprising Cr film is formed above the channel 21, thereafter an exposed Cr film is removed by etching to form a gate electrode 23 and a mask layer 4 comprising a metal film 16 of Cr film and a resist pattern film 17. Thereafter, the TFT array substrate in process of manufacturing is dipped in an etchant comprising phosphoric acid, acetic acid and nitric acid as the main components for a duration necessary for the Al-0.2 at % Cu film of about 200 nm in thickness to remove the etch residue such as short-circuited portion between the lines in the pattern made of Al-0.2 at % Cu.

Figure 6F:
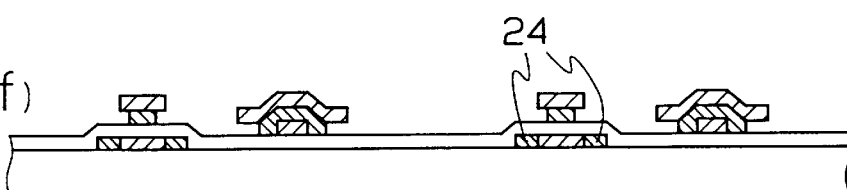
Figure 6G:
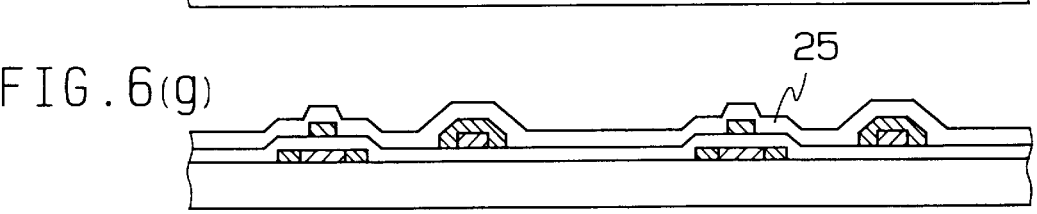
Figure 7A:
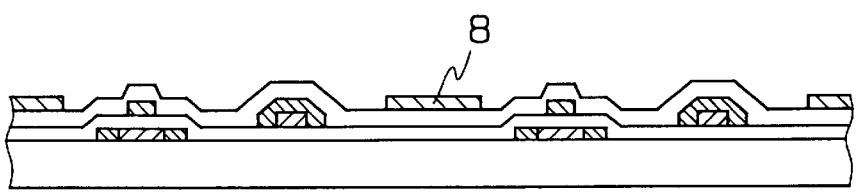
FIGS. 7(a) to 7(d) are views showing steps for manufacturing a TFT array substrate of a liquid crystal display device according to Embodiment 4 of the present invention.
Figure 7B:
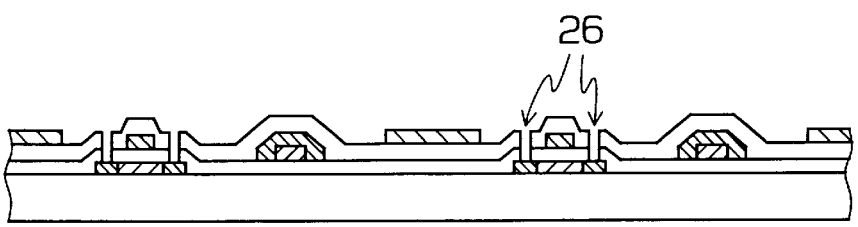

As shown in FIG. 6(f), before removing the resist pattern film 17, a phosphorus ion is implanted for example at an acceleration voltage of 70 keV to the whole surface to form an n-type semiconductor to become a source-drain region 24 in the channel 21. Since a side etch of about 2 μm in thickness is provided, phosphorus ion is not implanted in the channel 21 below the resist pattern film 17 when the metal film 16 constituting the gate electrode 23 is etched. Thus an offset type transistor can be formed to reduce the off-current. Continuously, by ECR plasma CVD and the like, in the hydrogen plasma, hydrogen is let to be diffused in polycrystaline silicon film and gate insulating film 5, and hydrogen is bound to the unbound end. As shown in FIG. 6(g), either the silicon oxide film or a silicon nitride film is deposited by plasma CVD atmospheric pressure CVD, or by sputtering to form an insulating film 25. Thereafter, annealing is made for example at 350° C. to activate the amorphous silicon film constituting the source-drain region 24. As shown in FIG. 7(a), as a transparent conductive film, an ITO film is deposited by about 100 nm in thickenss by sputtering, thereafter patterning is made by using a resist formed by photolithography, to form a pixel electrode 8. As shown in FIG. 7(b), a contact hole 26 is formed on the insulating film 25 on the source-drain region 24.

Figure 7C:
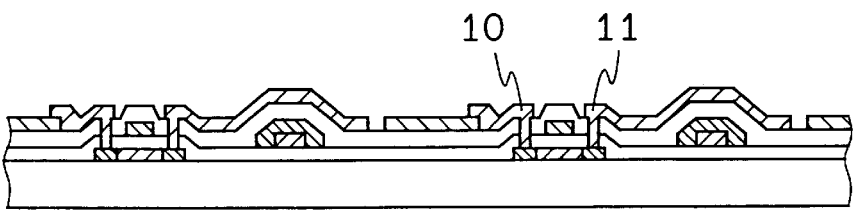
Figure 7D:
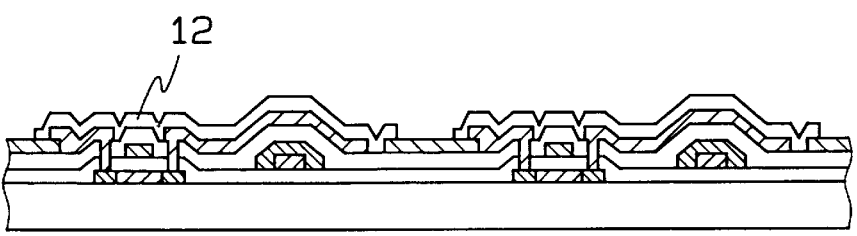

As shown in FIG. 7(c), there are continuously formed about 100 nm in thickness of Cr or Ti which has good ohmic contact property with the n-type semiconductor which is to be the source-drain region 24 as the bottom layer, about 300 nm in thickness of Al-0.2 at % Cu having small specific resistance as the intermediate layer, and about 50 nm in thickness of Cr which has high hardness to endure cleaning with a brush as the top layer, to form a three layers of film, followed by cleaning with a brush. Continuously, using an etching resist formed by photolithographic techniques three layers of film is patterned to form a first electrode line (in this embodiment, source electrode), and a first electrode and a second electrode (in this embodiment, source electrode 10 and drain electrode 11) which are electrically connected to the source-drain region 24 through the contact hole 26. As shown in FIG. 7(d), a silicon nitride film is deposited, and a passivation film 12 is formed on the portions other than on the pixel electrode 8.

Thus formed first substrate of TFT array substrate and the opposite substrate which is the second substrate wherein a light shield layer, an overcoat layer and an opposite electrode are formed on other transparent insulating substrate, on the surface of which an alignment film is formed, and the two substrates are oppositely disposed, and a liquid crystal is injected in the gap between them to seal in with a sealing agent, and polarizers are disposed on the outside of the TFT array substrate and on the outside of the opposite substrate to constitute a liquid crystal panel.

Although an Al-0.2 at % Cu film is used as a material for the gate line 22, an Al film or Al alloy film of other composition may be used if the film has small specific resistance and is free from corrosion caused by water and hillock caused by thermal history.

As a metal film 16, a Cr film is used, but if the film is not eroded by the etchant to the Al alloy film, other metal film such as tungsten film may be used. Alternatively, as a method of etching the etch residue by Al alloy film, a dry etching method may be employed in place of a wet etching method.

According to this embodiment, in a liquid crystal display device on which a planar TFT is provided, the same effect as that of Embodiment 2 is obtained.

Embodiment 5

Figure 8A:
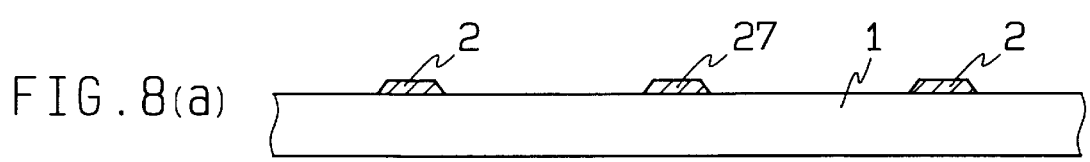
FIGS. 8(a) to 8(c) are views showing steps for manufacturing a TFT array substrate of a liquid crystal display device according to Embodiment 5 of the present invention.
Figure 8B:
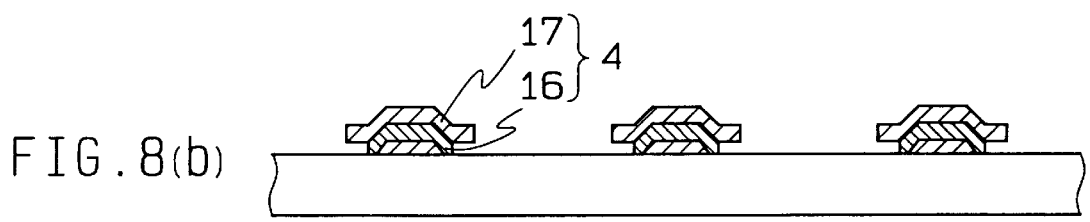
Figure 8C:

FIGS. 8(a) to 8(c) are sectional views showing steps for manufacturing a TFT array substrate of a liquid crystal display device on which a TFT is provided according to Embodiment 5 of the present invention. In the drawings, numeral 27 shows a line for storage capacitance. The same parts as those shown in FIGS. 5(a) to 5(h) are indicated with the same reference numerals and explanation thereof is omitted.

A method of manufacturing a TFT array substrate of a liquid crystal display device according to this embodiment is illustrated. As shown in FIG. 8(a), a metal film having small specific resistance such as Al-0.2 at % Cu is deposited on the surface of the transparent insulating substrate 1 to about 300 nm in thickness by sputtering, thereafter a resist is formed by photolithographic techniques, and pattern etching is made by using an etchant comprising phosphoric acid, acetic acid and nitric acid as main components to form a gate electrode, a gate line 2 and a storage capacitance line 27 and then the resist is removed. In this case, for etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film to tapered shape, the coverage of the film to be formed on the upper layer can be improved.

When the line 27 for storage capacitance is formed as a structure in which the storage capacitance is short-circuited with the gate line 2 on each pixel, it becomes a redundant structure to the breakage of the gate line 2.

As shown in FIG. 8(b), for example, Cr film is deposited to about 100 nm in thickness by sputtering, its surface is cleaned with a brush, then a resist is applied. Further a resist pattern film 17 is formed to a configuration by which a pattern of Al-0.2 at % Cu film such as the gate line 2 and a line 27 for storage capacitance is covered; thereafter an exposed Cr film is removed by etching to form a mask layer 4 comprising a metal film 16 of Cr and a resist pattern film 17. Thereafter, the TFT array substrate in process of manufacturing is dipped in an etchant comprising phosphoric acid, acetic acid and nitric acid as the main components for a duration necessary for the Al-0.2 at % Cu film of about 300 nm to be etched, to remove the etch residue such as short-circuited portion between the lines in the line pattern made of Al-0.2 at % Cu film, thereafter, as shown in FIG. 8(c), a resist pattern film 17 and a metal film 16 constituting the mask layer 4 are removed.

The subsequent steps are the same as those in and after the step for formation of the gate insulating film by plasma CVD and the like in Embodiment 1 or Embodiment 2, wherein a channel-etched liquid crystal display device or a channel-passivated liquid crystal display device is formed.

Although an Al-0.2 at % Cu film is used as a material for the gate line 2, an Al film or Al alloy film of other composition can be used if the film has small specific resistance and is free from corrosion caused by water and hillock caused by thermal history.

As a mask layer 4, a Cr film is used, but if the film is not eroded by the etchant to the Al alloy film, other metal film such as tungsten film can be used. Alternatively, as a method of etching the etch residue by Al alloy film, dry etching method can be employed in place of the wet etching method.

According to this embodiment, the same effect as that of Embodiment 2 is obtained, and further, because the line part such as gate line 2 is covered with the mask layer 4 and the defective portion of short-circuited portion between the lines is removed, and further, a metal film 16 which constitutes a mask layer 4 is removed, occurrence of short circuit defect derived from the metal film 16 can be prevented.

Embodiment 6

Figure 9A:
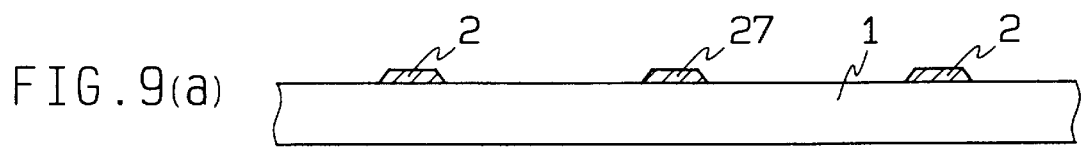
FIGS. 9(a) to 9(c) are views showing steps for manufacturing a TFT array substrate of a liquid crystal display device according to Embodiment 6 of the present invention.
Figure 9B:
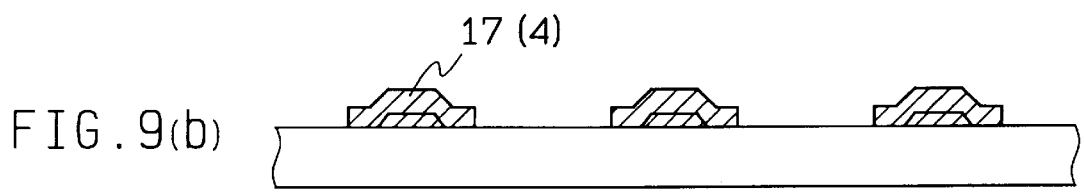
Figure 9C:
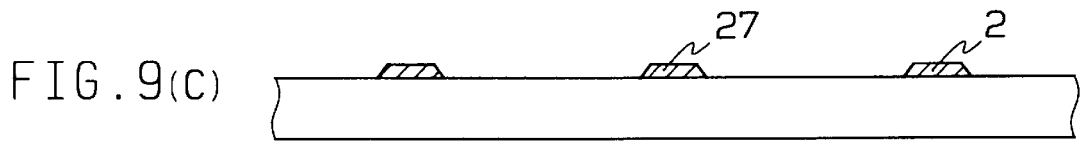

FIGS. 9(a) to 9(c) are the sectional views showing the manufacturing steps of the TFT array substrate of the liquid crystal display device on which TFT is provided according to Embodiment 6 of the present invention. Since the reference numerals in the drawing are the same as those shown in FIGS. 8(a) to 8(c), explanation thereof is omitted.

A method of manufacturing a TFT array substrate of a liquid crystal display device according to this embodiment is illustrated. As shown in FIG. 9(a), a metal film having small specific resistance such as Al-0.2 at % Cu is deposited on the surface of the transparent insulating substrate 1 to about 300 nm in thickness by sputtering method, thereafter a resist is formed by photolithographic techniques, and pattern etching is made by using an etchant comprising phosphoric acid, acetic acid and nitric acid as main components to form a gate line 2 and storage capacitance line 27 having gate electrodes, and then the resist is removed. In this case, for etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film in tapered shape, the coverage of the film to be formed on the upper layer can be improved.

When the line 27 for storage capacitance is formed as a structure in which the storage capacitance is short-circuited with the gate line 2 on each pixel, it becomes a redundant structure to the breakage of the gate line 2.

As shown in FIG. 9(b), a resist is applied. The resist 17 is formed into a configuration with which a line pattern of Al-0.2 at % Cu film such as the gate line 2 and a line 27 for storage capacitance is covered to make a mask layer 4. Thereafter, the TFT array substrate in process of manufacturing is dipped in an etchant comprising phosphoric acid, acetic acid and nitric acid as the main components for a duration necessary for the Al-0.2 at % Cu film of about 300 nm to be etched to remove the etch residue such as short-circuited portion between the lines in the pattern made of Al-0.2 at % Cu film. Next, as shown in FIG. 9(c), a resist pattern film 17 constituting the mask layer 4 is removed.

The subsequent steps are the same as those in and after the step for formation of the gate insulating film by plasma CVD and the like in Embodiment 1 or Embodiment 2, wherein a channel-etched liquid crystal display device or a channel-passivated liquid crystal display device is formed.

Although an Al-0.2 at % Cu film is used as a material for the gate line 2, an Al film or Al alloy film of other composition can be used if the film has small specific resistance and is free from corrosion by water and hillock caused by thermal history.

As a method of etching the etch residue by Al alloy film, dry etching method can be employed in place of wet etching method.

According to this embodiment, the same effect as that of Embodiment 1 is obtained, and further, in removing the defective portion of short-circuited portion between the lines by covering the line portion such as gate line 2 with a mask layer 4, the mask layer 4 can be substituted by a resist pattern film 17, by which the process can be simplified.

Embodiment 7

FIGS. 10(a) to 10(f) and FIGS. 11(a) to 11(e) are sectional views showing steps for manufacturing a TFT array substrate of a liquid crystal display device of a storage capacitance on-gate system on which a channel-etched TFT is provided according to Embodiment 7 of the present invention. In the drawings, reference numeral 28 shows a gate terminal, numeral 29 shows a resist pattern film formed on the contact part of the gate terminal 28, numeral 30 shows $Al_2O_3$, numeral 31 shows a terminal, numeral 32 shows a contact hole formed on the contact part on the gate terminal 28, and numeral 33 shows a terminal contact line for electrically connecting the gate terminal 28 with the terminal 31. The same parts as those shown in FIGS. 1(a) to 1(g) are indicated with the same reference numerals and explanation thereof is omitted.

Figure 10A:
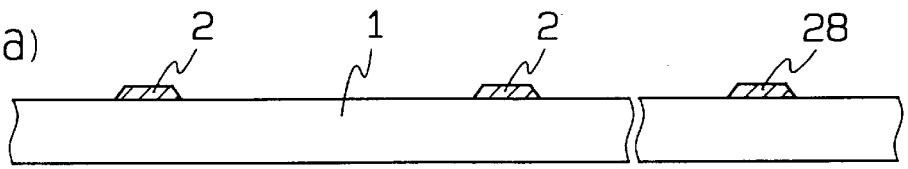
FIGS. 10(a) to 10(f) are views showing steps for manufacturing a TFT array substrate of a liquid crystal display device according to Embodiment 7 of the present invention.

A method of manufacturing a TFT array substrate of a storage capacitance on-gate system liquid crystal display device according to this embodiment is illustrated. As shown in FIG. 10(a), a metal film having small specific resistance such as Al-0.2 at % Cu is deposited on the surface of the transparent insulating substrate 1 to about 300 nm in thickness by sputtering method, thereafter a resist is formed by photolithographic techniques and pattern etching is made by using an etchant comprising phosphoric acid, acetic acid and nitric acid as main components to form a gate electrode, a gate line 2 and a gate terminal 28, and then the resist is removed. In this case, for etching of the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film into tapered shape, the coverage of the film to be formed on the upper layer can be improved.

Figure 10B:
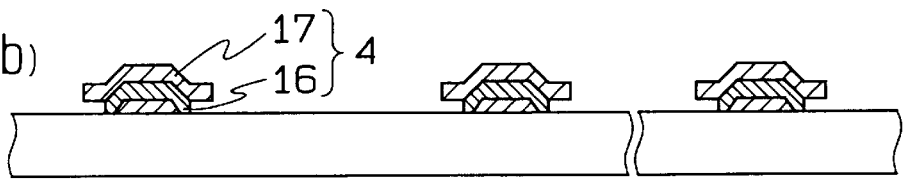
Figure 10C:
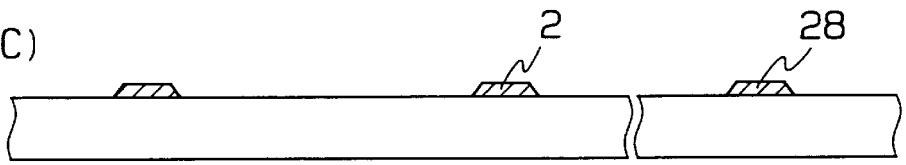
Figure 10D:
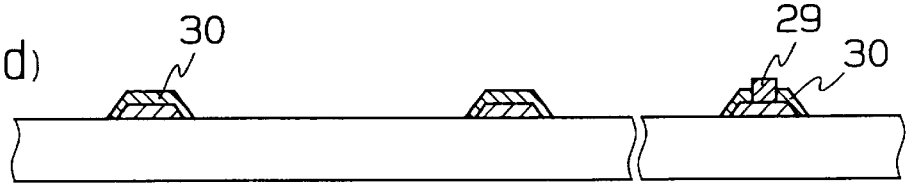

As shown in FIG. 10(b), for example, Cr film is deposited to about 100 nm in thickness by sputtering method, its surface is cleaned with a brush, then a resist is applied. Further, a resist pattern film 17 is formed as a configuration with which the line pattern of Al-0.2 at % Cu film such as the gate line 2 is covered; thereafter an exposed Cr film is removed by etching to form a mask layer 4 comprising a metal film 16 of Cr film and a resist pattern film 17. Thereafter, the TFT array substrate in process of manufacturing is dipped in an etchant comprising phosphoric acid, acetic acid and nitric acid as the main components for a duration necessary for the Al-0.2 at % Cu film of about 300 nm in thickness to be etched, to remove the etch residue such as short-circuited portion between the lines in the line pattern made of Al-0.2 at % Cu film. Thereafter, as shown in FIG. 10(c), a resist pattern film 17 and a metal film 16 which had constituted the mask layer 4 are removed.

Figure 10E:
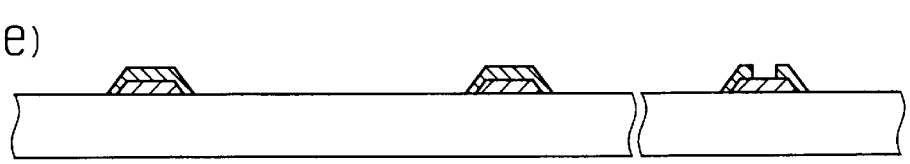
Figure 10F:
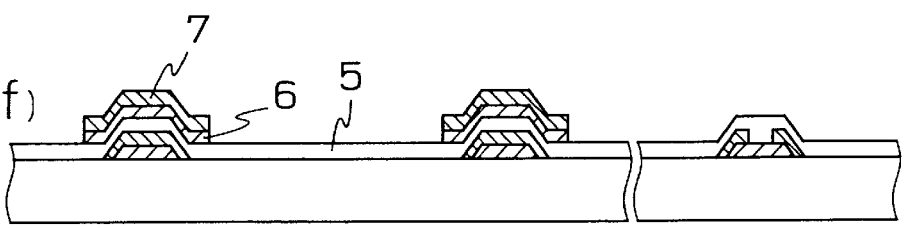

As shown in FIG. 10(f), a resist pattern film 29 is formed on the contact part with the upper layer of the gate terminal 28, thereafter, in order to prevent corrosion of the gate line 2 or inter-layer short circuit with the signal line, the Al-0.2 at % Cu films of the portions not covered with a resist of the gate line 2 and the gate terminal 28 are subjected to anodic oxidation to form $Al_2O_3$ film 30 on the surface thereof by for example about 100 nm in thickness. In this case, the contact portion on the gate terminal 28 is not subjected to anodic oxidation since it is covered with a resist pattern film 29. As shown in FIG. 10(e), the resist pattern film 29 on the gate terminal portion is removed.

Figure 11A:
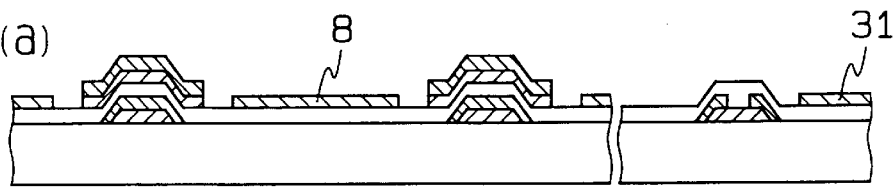
FIGS. 11(a) to 11(e) are views showing steps for manufacturing a TFT array substrate of a liquid crystal display device according to Embodiment 7 of the present invention.
Figure 11B:
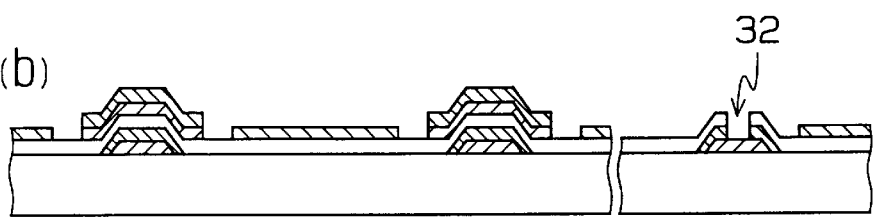

As shown in FIG. 10(f), by plasma CVD process and the like, there are sequentially formed about 500 nm of silicon nitride film to become a gate insulating film 5, about 200 nm in thickness of amorphous silicon film, and about 50 nm in thickness of $n^+$ type amorphous silicon film doped with impurities, thereafter the amorphous silicon film and the $n^+$ type amorphous silicon film are simultaneously patterned with a resist formed by photolithographic techniques, to form a semiconductor layer 6 and an ohmic contact layer 7 on the position above the gate line 3. As shown in FIG. 11(a), as a transparent conductive film, about 100 nm in thickness of ITO is formed by sputtering, and patterning is made by using a resist formed by photolithography to form a pixel electrode 8 and a terminal 31. As shown in FIG. 11(b), a silicon nitride film (gate insulating film 5) which forms a contact portion on the gate terminal 28 is removed to form a contact hole 32.

Figure 11C:
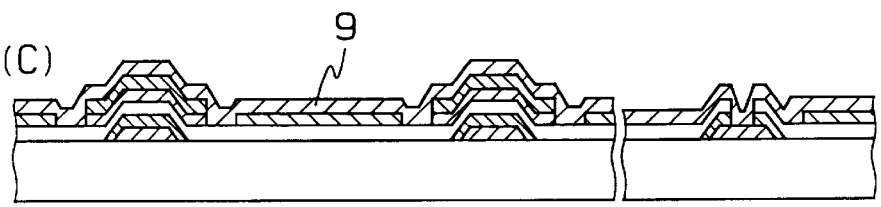
Figure 11D:
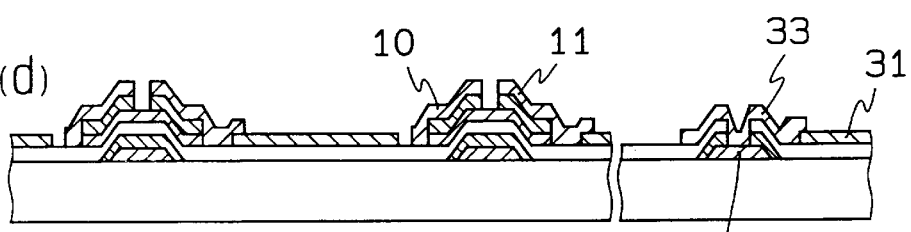
Figure 11E:
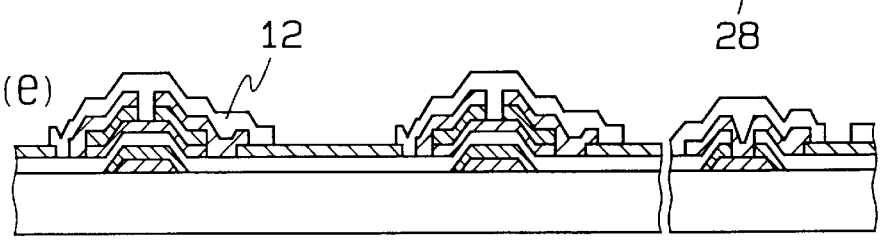

As shown in FIG. 11(c), there are continuously formed about 100 nm in thickness of Cr or Ti which has good ohmic contact property to the $n^+$ type amorphous silicon film which constitutes the ohmic contact layer 7 as the lowest layer, about 300 nm in thickness of Al-0.2 at % Cu having small specific resistance as the intermediate layer, and about 50 nm in thickness of Kr which has high hardness to endure brush cleaning as the top layer, to form a metal film 9 comprising a three layers of film, followed by brush cleaning. Continuously, as shown in FIG. 11(d), using an etching resist formed by photolithography, the metal film 9 is patterned to form a terminal connection line 33 for electrically connecting the two separated source lines on the ohmic contact layer 7, namely, a source electrode 10 and a drain electrode 11, and a gate terminal 28 and a terminal 31. Continuously, by means of dry etching process, an $n^+$ type amorphous silicon layer (ohmic contact layer 9) formed on the portions in which the source electrode 10 and drain 20 electrode 11 are removed are etched to form a channel, thereafter the resist is removed. As shown in FIG. 11(e), the silicon nitride film is deposited to form a passivation film 12 on the portion other than on the pixel electrode 8 and the terminal 31.

Thus formed first substrate of TFT array substrate and the opposite substrate which is the second substrate wherein a light shield layer, an overcoat layer and an opposite electrode are formed on other transparent insulating substrate, on the surface of which an alignment film is formed, and the two substrates are oppositely disposed, and a liquid crystal is injected in the gap between them to seal in with a sealing agent, and polarizers are disposed on the TFT array substrate and on the opposite substrate to constitute a liquid crystal panel.

Although an Al-0.2 at % Cu film is used as a material for the gate electrode line (in this embodiment, gate line 2), an Al film or Al alloy film of other composition can be used if the film has small specific resistance and is free from corrosion caused by water and hillock caused by thermal history.

As a metal film 16, a Cr film is used, but if the film is not eroded by the etchant to the Al alloy film, other metal film such as tungsten film may be used. Alternatively, as a method of etching the etch residue by Al alloy film, dry etching method can be employed in place of the wet etching method.

In the above, as a mask layer 4, there are formed a metal film 16 and a resist pattern film 17, but the mask layer 4 can be constituted by a resist pattern film 17 only.

According to this embodiment, by subjecting the Al-0.2 at % Cu film which constitutes the gate line 2 to anodic oxidation to form $Al_2O_3$ on the surface, even in the liquid crystal display device having a structure to prevent corrosion of the Al-0.2 at % Cu film or interlayer short circuit between the gate line 2 and other signal line, the same effect as that of Embodiment 5 or Embodiment 6 is obtainable.

Embodiment 8

FIGS. 12(a) to 12(f) and FIGS. 13(a) to 13(e) are sectional views showing steps for manufacturing a TFT array substrate of a liquid crystal display device of a storage capacitance on-gate system on which a channel-etched TFT is provided according to Embodiment 8 of the present invention. In the drawings, the reference numeral 34 shows a groove formed by removing the gate insulating film 5. The same portions as those shown in FIGS. 10(a) to 10(f) and FIGS. 11(a) to 11(e) are indicated with the same reference numerals and explanation thereof is omitted.

Figure 12A:
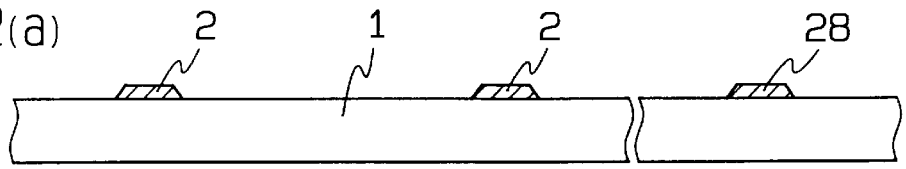
FIGS. 12(a) to 12(f) are views showing steps for manufacturing a TFT array substrate of a liquid crystal display device according to Embodiment 8 of the present invention.

A method of manufacturing a TFT array substrate of a liquid crystal display device of a storage capacitance on-gate system according to this embodiment is illustrated. As shown in FIG. 12(a), a metal film having small specific resistance such as Al-0.2 at % Cu is deposited on the surface of the transparent insulating substrate 1 to about 300 nm in thickness by sputtering method, thereafter a resist is formed by photolithographic techniques and pattern etching is made by using an etchant comprising phosphoric acid, acetic acid and nitric acid as main components to form a gate electrode, a gate line 2 and a gate terminal 28 and then the resist is removed. In this case, for etching the Al-0.2 at % Cu film an etchant comprising phosphoric acid, acetic acid and nitric acid as main components is used. By previously reviewing the compositions of phosphoric acid, acetic acid and nitric acid and forming the etching end face of the Al-0.2 at % Cu film to tapered shape, the coverage of the film to be formed on the upper layer can be improved.

Figure 12B:
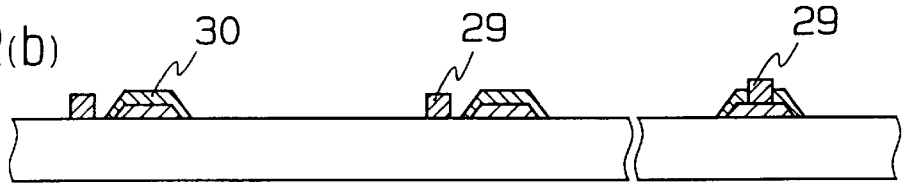
Figure 12C:
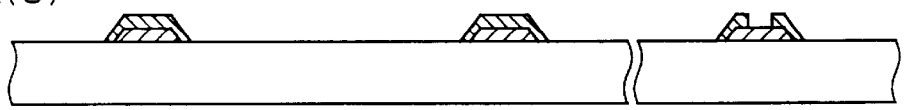

As shown in FIG. 12(b), a resist pattern film 29 is formed on the contact portion with the upper layer of the gate terminal 28, thereafter, in order to prevent corrosion of the gate line 2 or inter-layer short circuit with the signal line, the Al-0.2 at % Cu films of the portions not covered with a resist of the gate line 2 and the gate terminal 28 are subjected to anodic oxidation to form $Al_2O_3$ film 30 on the surface thereof by for example about 100 nm in thickness. In this case, the contact portion on the gate terminal 28 is not subjected to anodic oxidation since it is covered with a resist pattern film 29. Also, in case of the existence of the etch residue of the Al-0.2 at % Cu film between the adjacent gate lines 2 in the pixel, because such residue is covered with the resist pattern film 29 at the position to divide the areas between the gate lines 2 and is not subjected to anodic oxidation, removal of the etch residue in the subsequent step is possible. As shown in FIG. 12(c), the resist pattern film 29 is removed.

Figure 12D:
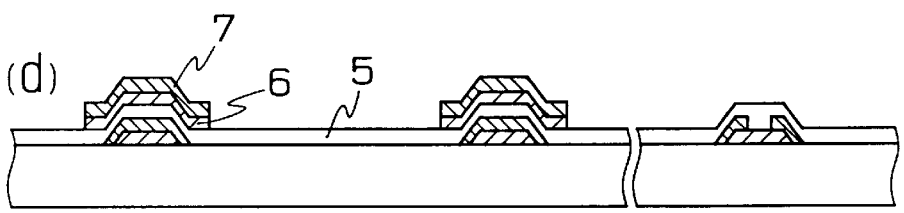
Figure 12E:
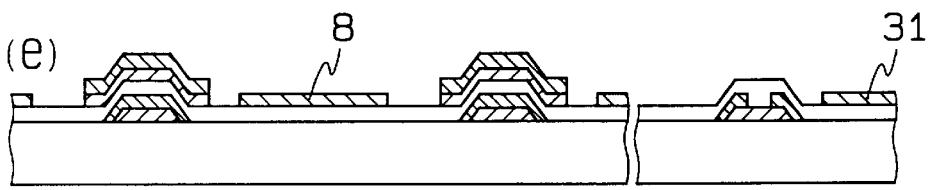
Figure 12F:
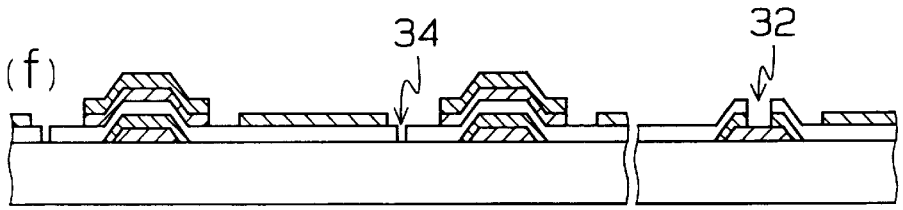

As shown in FIG. 12(d), by plasma CVD and the like, there are sequentially formed about 500 nm in thickness of silicon nitride film to become a gate insulating film 5, about 200 nm in thickness of amorphous silicon film, and about 50 nm in thickness of $n^+$ type amorphous silicon film doped with impurities, thereafter the amorphous silicon film and the $n^+$ type amorphous silicon film are simultaneously patterned with a resist formed by photolithographic techniques, to form a semiconductor layer 6 and an ohmic contact layer 7 on the position above the gate line 2. As shown in FIG. 12(e), as a transparent conductive film, about 100 nm in thickness of ITO is formed by sputtering, and patterning is made by using a resist formed by photolithography, to form a pixel electrode 8 and a terminal 31. As shown in FIG. 12(f), a contact portion on the gate terminal 28 covered with the resist pattern film 29 and a silicon nitride film (gate insulating film 5) on the adjacent gate lines 2 are removed to form a contact hole 32 and a groove part 34.

Figure 13A:
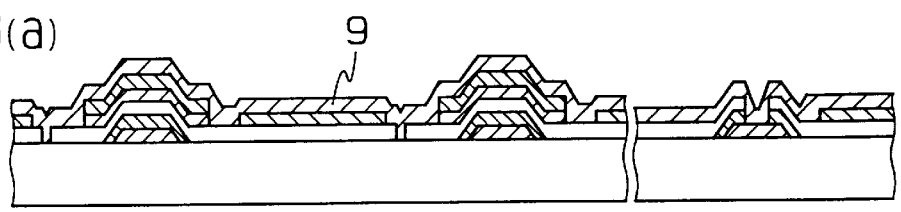
FIGS. 13(a) to 13(c) are views showing steps for manufacturing a TFT array substrate of a liquid crystal display device according to Embodiment 8 of the present invention.
Figure 13B:
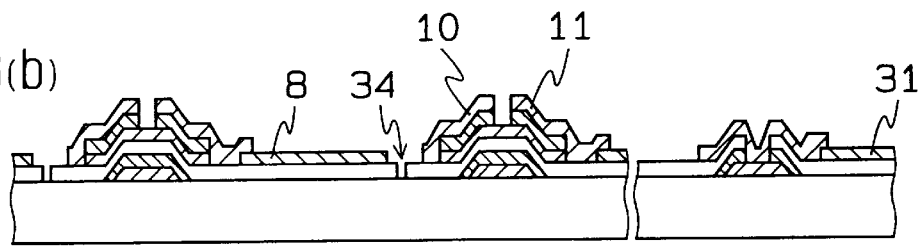
Figure 13C:
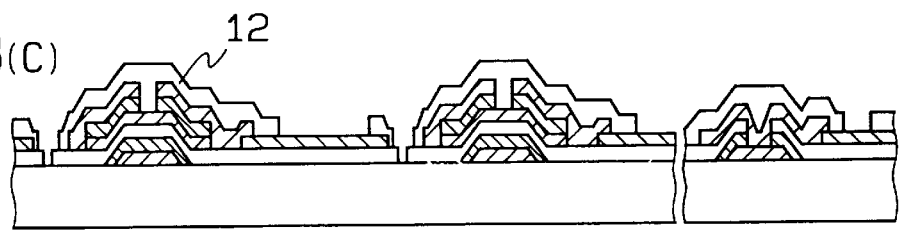

As shown in FIG. 13(a), there are continuously formed about 100 nm in thickness of Cr or Ti which has good ohmic contact property to the $n^+$ type amorphous silicon film which constitutes the ohmic-contact layer 7 on the lowest layer, about 300 nm of Al-0.2 at % Cu having small specific resistance on the intermediate layer, and about 50 nm in thickness of Cr which has high hardness to endure brush cleaning as the top layer, to form a metal film 9 comprising a three layers of film, followed by brush cleaning. Continuously, as shown in FIG. 13(b), using an etching resist formed by photolithographic techniques, the metal film 9 is patterned to form a terminal connection line 33 for electrically connecting the two separated source lines on the ohmic contact layer 7, namely, a source electrode 10 and a drain electrode 11, and a gate terminal 28 and a terminal 31. Continuously, by means of dry etching, an $n^+$ type amorphous silicon layer (ohmic contact layer 9) formed on the portions in which the source electrode 10 and drain electrode 11 are removed are etched to form a channel, thereafter the resist is removed. As shown in FIG. 13(c), the silicon nitride is deposited to form a passivation film 12 on the portion other than on the pixel electrode 8, terminal 31, and a groove 34. Here, the groove 34 corresponds to the opening 15 which is provided on the portion which is liable to show a short circuit defect as shown in FIG. 4.

By the above-mentioned steps, the region in which the etch residue remains, which causes a short circuit between the gate lines 2, has such condition as to be exposed to the surface by the formation of the groove 34, and also, as the other signal lines such as the gate lines 2 are covered with the gate insulating film 5 and passivation film 12, under such condition the TFT array substrate is dipped for example in an etchant comprising phosphoric acid, acetic acid and nitric acid as main components for a duration necessary for about 300 nm in thickness of Al-0.2 at % Cu film to be etched to remove the etch residue caused by short circuit between the lines in the pattern made of the Al-0.2 at % Cu film. At this time, it is desirable to remove the etch residue under the condition where the resist formed for patterning the passivation film 12 is allowed to remain, from the viewpoint of the prevention of corrosion of the signal line.

Thus formed first substrate of TFT array substrate and the opposite substrate which is the second substrate wherein a light shield layer, an overcoat layer and an opposite electrode are formed on other transparent insulating substrate, on the surface of which an alignment film is formed, and the two substrates are oppositely disposed, and a liquid crystal is injected in the gap between them to seal in with a sealing agent, and polarizers are disposed on the outside of the TFT array substrate and on the outside of the opposite substrate to constitute a liquid crystal panel.

Although an Al-0.2 at % Cu film is used as a material for the gate line 2, an Al film or Al alloy film of other composition can be used if the film has small specific resistance and is free from corrosion caused by water and hillock caused by thermal history.

According to this embodiment, without forming a mask layer for protecting the gate electrode line (in this embodiment, gate line 2), same effect as that of Embodiment 7 is obtained.

Embodiment 9

Figure 14A:
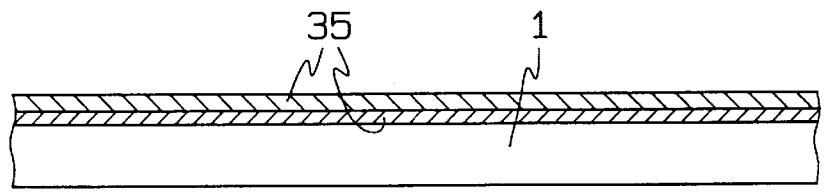
FIGS. 14(a) to 14(c) are views showing steps for manufacturing a TFT array substrate of a liquid crystal display device according to Embodiment 9 of the present invention.
Figure 14B:
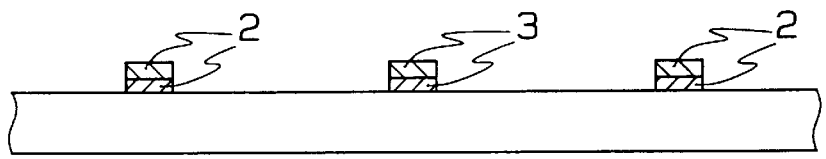
Figure 14C:

FIGS. 14(a) to 14(c) are sectional views showing steps for manufacturing a TFT array substrate of a liquid crystal display device on which a TFT is provided according to Embodiment 9 of the present invention. In the drawing, the refernce numeral 35 shows a metal film. The same parts as those shown in FIG. 1 are indicated with the same reference numerals and explanation thereof is omitted.

Next, a method of manufacturing a TFT array substrate of a liquid crystal display device according to this embodiment is illustrated. First, as shown in FIG. 14(a), a metal film having small specific resistance such as Al-0.2 at % Cu is deposited continuously on the lower layer surface of the transparent insulating substrate 1 to about 300 nm in thickness by sputtering, and a metal film having the higher hardness than Al such as Mo on the upper layer, and after forming a metal film 35 comprising the two layers of film, the TFT array substrate is cleaned by brush cleaning. Continuously, as shown in FIG. 14(b), a resist is formed by photolithographic techniques, and etching is made continuously by using an etchant comprising phosphoric acid, acetic acid and nitric acid as main components to form a gate electrode, a gate line 2 and common line 3 and then the resist is removed. In this case, by forming the two kinds of metal films constituting the metal film 35 simultaneously by using a metal capable of being etched, the metal film 35 can be formed as a gate electrode, a gate line 3 and a common line 3 by a single etching.

Also, for etching of the Al-0.2 at % Cu film, an etchant comprising phosphoric acid, acetic acid and nitric acid as main components is used. By previously reviewing the compositions of phosphoric acid, acetic acid and nitric acid and setting the etching rate of the Mo film larger than the etching rate of Al-0.2 at % Cu film, and forming the etching end face of the Al-0.2 at % Cu film into tapered shape, the coverage of the film to be formed on the upper layer can be improved. Alternatively, by using dry etching method for the etching of the metal film 35, allowing the etching gas to contain oxygen, and etching the metal plate 35 while oxidizing the resist, the etching end face of the Al-0.2 at % Cu film can be formed into a tapered shape.

As shown in FIG. 14(c), after etching of the metal film 35 and removal of the resist, the Mo film can be removed. The upper layer film of the metal film 35 can be formed of a metal having the higher hardness than Al and high melting point, and can be removed by providing the Al-0.2 at % Cu film with anodic oxidation processing. As a result, through construction of the step difference by line in the gate line 2 and the like, coverage of the film to be formed on the upper layer can be improved. Furthermore, by removing the upper layer film of the metal film 35 constituting the gate line 2 and the like, dust and the like settled on the upper layer film can be removed.

The following steps are the same as those of forming the gate insulating film by plasma CVD in Embodiment 1 or Embodiment 2 and thereafter, which are designed to form the channel-etched liquid crystal display device or channel-protected liquid crystal display device.

Although an Al-0.2 at % Cu film is used as a material for the gate line 2, an Al film or Al alloy film of other composition may be used if the film has small specific resistance and is free from corrosion caused by water and hillock caused by thermal history.

According to this embodiment, by forming a metal layer having high hardness on the surface of the gate line 2 and forming a resist after cleaning with a bush for patterning, the same effect as that of Embodiment 1 is obtained.

Embodiment 10

Figure 15A:
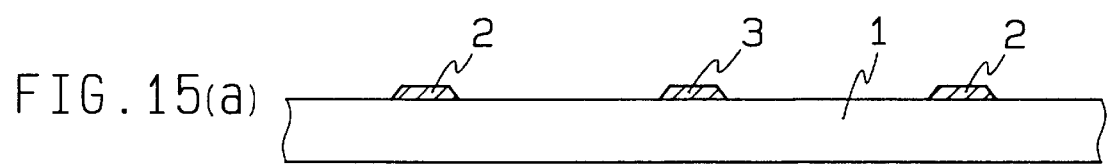
FIGS. 15(a) to 15(c) are views showing steps for manufacturing a TFT array substrate of a liquid crystal display device according to Embodiment 10 of the present invention.
Figure 15B:
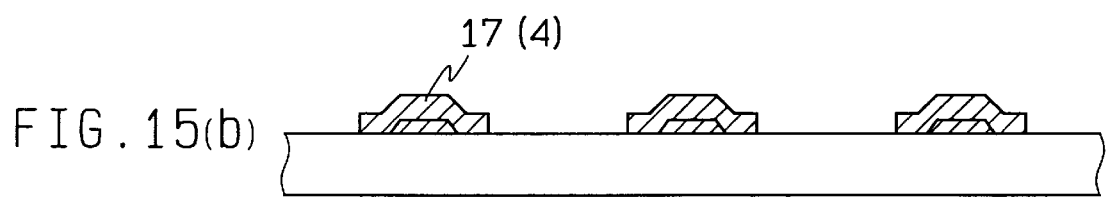
Figure 15C:
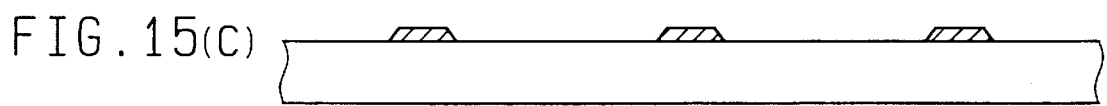

FIGS. 15(a) to 15(c) are the sectional views showing the manufacturing steps of the TFT array substrate of the liquid crystal display device on which TFT is provided according to Embodiment 10 of the present invention. Since the reference numerals shown in the drawings are the same as those shown in FIGS. 9(a) to 9(c), explanation thereof is omitted.

A method of manufacturing a TFT array substrate of a liquid crystal display device according to this embodiment is illustrated. As shown in FIG. 15(a), a metal film such as Cr or Ta is deposited on the surface of the transparent insulating substrate 1 to about 400 nm in thickness by sputtering, thereafter a resist is formed by photolithographic techniques, and pattern etching is made by using an etchant comprising nitric acid to form a gate line 2 and common line 3 having gate electrodes, and then the resist is removed. In this case, for the etching of the Cr or Ta film an etchant comprising nitric acid is used. By previously reviewing the composition of nitric acid and forming the etching end face of the Cr or Ta film into tapered shape, the coverage of the film to be formed on the upper layer can be improved.

As shown in FIG. 15(b), a resist is applied, and a resist pattern film 17 is formed into a configuration with which the gate line 2 and the common line 3 and the like are covered. Thereafter, the TFT array substrate in process of manufacturing is dipped in an etchant for the metal film such as Cr film or Ta film constituting the gate line 2 for a duration necessary for the above metal film of about 400 nm to be etched to remove the etch residue such as short-circuited portion between the lines in the pattern by the metal film. As shown in FIG. 15(c), a resist pattern film 17 which had constituted the mask layer 4 is removed.

The subsequent steps are the same as those in and after the step for formation of the gate insulating film by plasma CVD process and the like in Embodiment 1 or Embodiment 2, wherein a channel-passivated liquid crystal display device or a channel-passivated liquid crystal display device is fabricated.

According to this Embodiment, even when the gate line 2 is formed by Cr film or the like, by exactly removing the short circuit defect between the signal lines by etching, similarly, a short circuit between the signal lines can be prevented and highly reliable liquid crystal display device can be produced in high yield.

Embodiment 11

FIGS. 16(a) to 16(g) are the sectional views showing the manufacturing steps of the TFT array substrate of the liquid crystal display device on which a channel etching type TFT is provided according to Embodiment 11 of the present invention. Since the reference numerals shown in the drawing are the same as those shown in FIGS. 10(a) to 10(f) and FIGS. 11(a) to 11(e), explanation thereof is omitted.

Figure 16A:
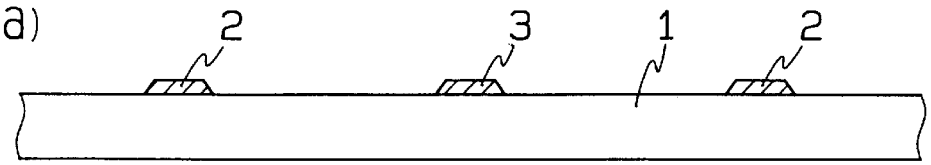
FIGS. 16(a) to 16(g) are views showing steps for manufacturing a TFT array substrate of a liquid crystal display device according to Embodiment 11 of the present invention.

A method of manufacturing a TFT array substrate of a liquid crystal display device according to this embodiment is illustrated. As shown in FIG. 16(a), a metal film such as Cr or Ta is deposited on the surface of the transparent insulating substrate 1 to about 400 nm in thickness by sputtering, thereafter a resist is formed by photolithography, and pattern etching is made by using an etchant comprising nitric acid to form a gate electrode, a gate line 2 and common line 3 and then the resist is removed. In this case, for etching of the Cr film or Ta film an etchant comprising nitric acid is used. By previously reviewing the composition of nitric acid and forming the etching end face of the Cr film or Ta film into tapered shape, the coverage of the film to be formed on the upper layer can be improved.

Figure 16B:
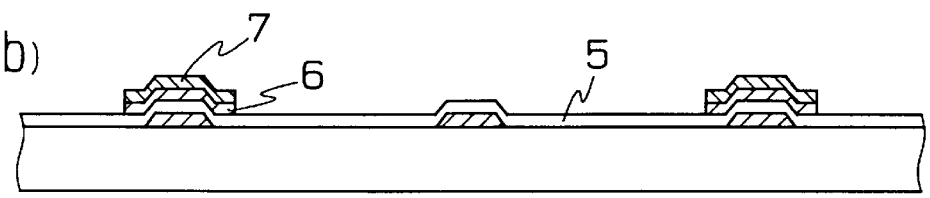
Figure 16C:
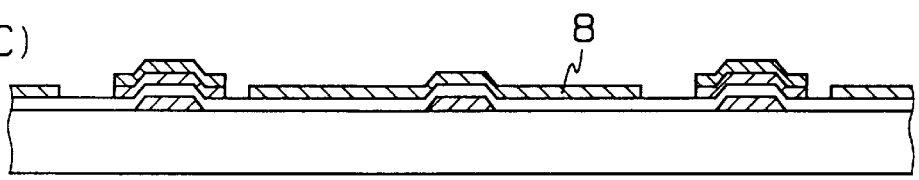

As shown in FIG. 16(b), by plasma CVD and the like, there are sequentially formed about 500 nm in thickness of silicon nitride film to become a gate insulating film 5, about 200 nm of amorphous silicon film, and about 50 nm in thickness of $n^+$ type amorphous silicon film doped with impurities, thereafter the amorphous silicon film and the $n^+$ type amorphous silicon film are simultaneously patterned with a resist formed by photolithographic techniques, to form a semiconductor layer 6 and an ohmic contact layer 7 on the position above the gate line 2. As shown in FIG. 16(c), as a transparent conductive film, about 100 nm in thickness of an ITO film is formed by sputtering, and patterning is made by using a resist formed by photolithography to form a pixel electrode 8.

Figure 16D:
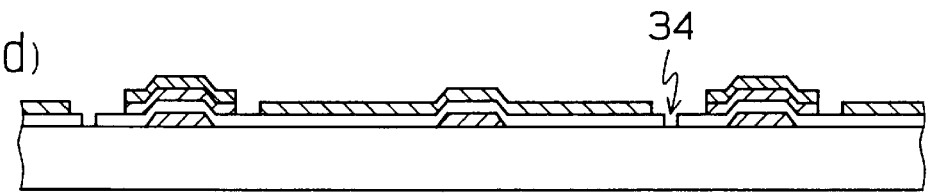

As shown in FIG. 16(d), a silicon nitride film (gate insulating film 5) formed between the gate lines 2 in a manner that the adjacent gate lines 2 are divided and are etched to form a groove 34. This step of etching the silicon nitride film is carried out simultaneously with etching of the silicon nitride film for forming the contact hole as a contact portion with the upper layer on the gate terminal.

Figure 16E:
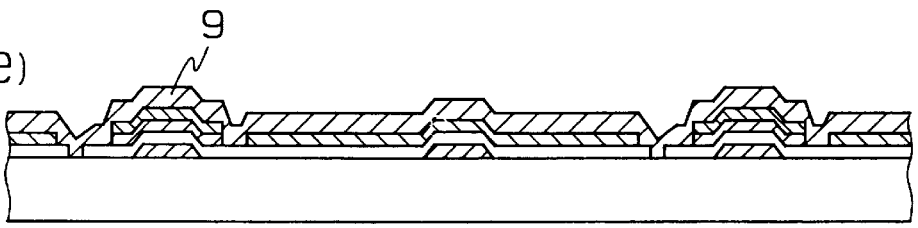
Figure 16F:
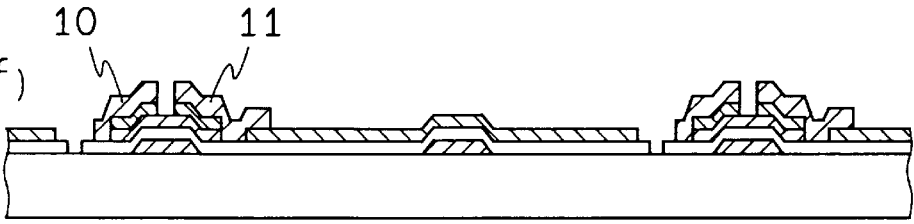
Figure 16G:
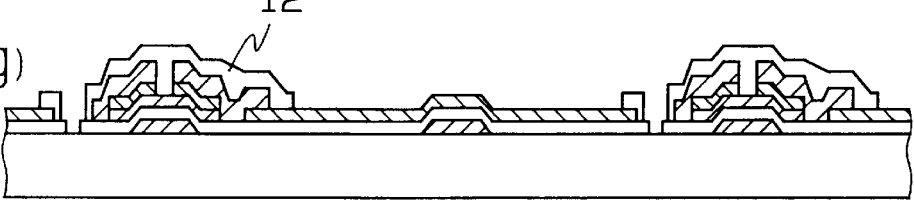
Figure 17A:
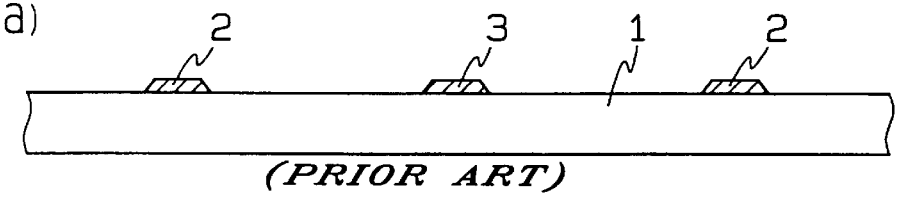
FIGS. 17(a) to 17(d) are views showing steps for manufacturing a conventional TFT array substrate of the liquid crystal display device.
Figure 17B:
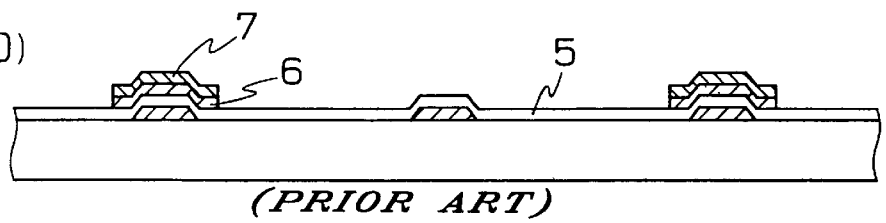
Figure 17C:
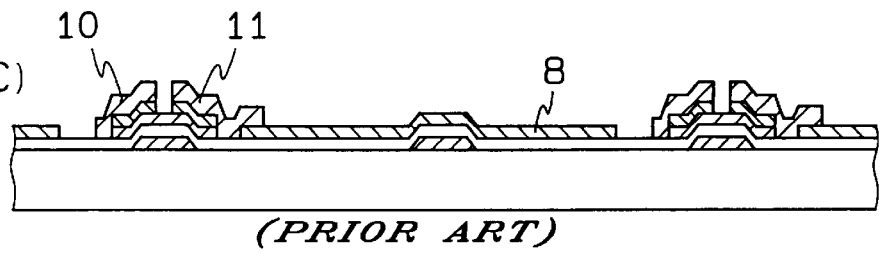
Figure 17D:
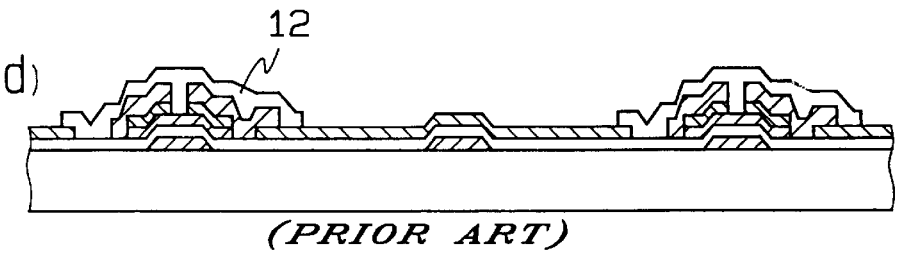

As shown in FIG. 16(e), there are continuously formed about 100 nm in thickness of Cr or Ti which has good ohmic contact property with the $n^+$ type amorphous silicon film which constitutes the ohmic contact layer 7 on the lowest layer, about 300 nm in thickness of Al-0.2 at % Cu having small specific resistance on the intermediate layer, and about 50 nm in thickness of Cr which has high hardness to endure brush cleaning on the top layer, to form a metal film 9 comprising a three layers of film, followed by brush cleaning. Continuously, as shown in FIG. 16(f), using an etching resist formed by photolithographic techniques, the metal film 9 is patterned to make source lines, and form the two separated source lines, namely, a source electrode 10 and a drain electrode 11, on the ohmic contact layer 7. Continuously, by means of a dry etching method, an $n^+$ type amorphous silicon layer (ohmic contact layer 9) formed on the portions in which the source electrode 10 and drain electrode 11 are removed are etched to form a channel, thereafter the resist is removed. As shown in FIG. 16(g), the silicon nitride film is deposited to form a passivation film 12 on the portion other than on the pixel electrode 8 and groove 34. Here, the groove 34 corresponds to the opening 15 which is provided on the portion which is liable to cause short circuit defect as shown in FIG. 4.

By the above-mentioned steps, the region in which the etch residue is formed causes the short circuit between the gate lines 2 have such condition as to be exposed to the surface by the formation of the groove 34, and also, as the other signal lines such as the gate line 2 are covered with the gate insulating film 5 and passivation film 12, under such condition the TFT array substrate is dipped for example in an etchant for the metal films such as Cr film or Ta film which constitutes the gate line 2 for a duration necessary for about 400 nm in thickness of above metal film to be etched to remove the etch residue caused by short circuit between lines in the the pattern. At this time, it is desirable to carry out removal of the etch residue under the condition where the resist formed for patterning the passivation film 12 is allowed to remain, from the viewpoint of the prevention of corrosion of the signal line.

Thus formed first substrate of TFT array substrate and the opposite substrate which is the second substrate wherein a light shield layer, an overcoat layer and an opposite electrode are formed on other transparent insulating substrate, on the surface of which an orientation film is formed, and the two substrates are oppositely disposed, and a liquid crystal is injected in the gap between them to seal in with a sealing agent, and polarizers are disposed on the outside of the TFT array substrate and on the outside of the opposite substrate to constitute a liquid crystal panel.

According to this embodiment, the same effect as that of Embodiment 7 can be obtained without forming a mask layer for protecting a gate electrode line (in this embodiment, gate line 2).

According to this invention, even in case of constituting the signal line such as gate line by using a single layer film by Al film or Al alloy film or a multilayered film having Al type metal film on the surface layer for making the signal line having low resistance, the line surface can be covered with a metal film or non-metal film or a mask layer comprising a multilayered film of metal film and non-metal film to remove securely the short circuit defect between the signal lines by etching. Also, by removing the mask layer after removing the short circuit defects, the short circuit defects by mask layer can be removed.

Furthermore, by the step of partially removing the insulating layer and the like formed on the upper layer between the signal lines to expose the defective short-circuited portion between the signal lines and etching, the short circuit defects between the signal lines can be prevented without increasing the number of steps such as the formation of the mask layer.

Also, by constituting a metal layer of high hardness on the surface layer of the signal line and, followed by the steps of cleaning with a brush, forming a resist, and patterning, a short circuit between the signal lines can be prevented. As a result, the signal line can be constituted by the material having small specific resistance, so that the pattern can be formed as fine lines, and a liquid crystal display device of high aperture ratio with low power consumption can be manufactured in high yield.

It should be understood that the apparatus and methods which have been shown and described herein are illustrative of the invention and are not intended to be limitative thereof. Clearly, those skilled in the art may conceive of variations or modifications to the invention. However, any such variations or modifications which falls within the purview of this description are intented to be included therein as well. The scope of the invention is limited only by the claims appended hereto.

What is claimed is:

1. A manufacturing method of a liquid crystal display device comprising a first transparent insulating substrate, a gate electrode and a gate electrode line, a semiconductor layer, a source electrode and a source electrode line, a drain electrode, a gate insulating layer formed between the gate electrode and the semiconductor layer, a pixel electrode connected to the drain electrode, a second transparent insulating substrate, and a liquid crystal material interposed between the first and second substrate, the method comprising the steps of:

(a) forming a first metal layer of high electrical conductivity metal on the first substrate;

(b) patterning the first metal layer by etching using a first resist mask having a first pattern including a pattern of the gate electrode and the gate electrode line;

(c) forming a second metal layer of high hardness metal withstanding cleaning with a brush on the first substrate and the first metal layer;

(d) cleaning the surface of the second metal layer with a brush;

(e) patterning the second metal layer by etching using a second resist mask having a second pattern covering the first pattern;

(f) etching a first metal layer left unetched outside the first etched pattern in step (b) using a two layer resist mask including the second resist mask and the second metal layer left under the second resist mask; and (g) removing the second resist mask.

2. The manufacturing method of claim 1, wherein the second metal layer is formed of a metal of at least one member selected from the group consisting of Cr, Mo and W.

3. The manufacturing method of claim 1, wherein the second metal layer is formed of a metal having Vickers hardness of not less than 100.

4. The manufacturing method of claim 1, further comprising the step of:

(h) removing the second metal layer.

5. A liquid crystal display device comprising:

a transparent insulating first substrate;

a gate electrode and a gate electrode line;

a semiconductor layer;

a source electrode and source electrode line;

a drain electrode;

a gate insulating layer formed between the gate electrode and the semiconductor layer;

a pixel electrode connected to the drain electrode;

a transparent insulating second substrate; and a liquid crystal material interposed between the first and second substrates, wherein the source electrode, source electrode line and drain electrode are formed with a three layer metal film, a first lower metal layer formed of a metal of good ohmic contact with the semiconductor layer, a second middle metal layer formed of a metal of high electrical conductivity, and a third upper metal layer formed of a metal having a Vickers hardness of not less than 100 withstanding cleaning with a brush.

6. The liquid crystal display device of claim 5, wherein the first lower metal layer is formed of Cr or Ti.

7. The liquid crystal display device of claim 5, wherein the third upper metal layer is formed of a metal of at least one member selected from the group consisting of Cr, Mo and W.

8. The liquid crystal display device of claim 5, wherein the second upper metal layer is formed of a metal of at least one member selected from the group consisting of Cr, Mo and W.

9. The liquid crystal display device of claim 8, wherein the second upper metal layer is formed of a metal having Vickers hardness of not less than 100.

10. A manufacturing method of a liquid crystal display device comprising a first transparent insulating substrate, a gate electrode and a gate electrode line, a semiconductor layer, a source electrode and a source electrode line, a drain electrode, a gate insulating layer formed between the gate electrode and the semiconductor layer, a pixel electrode connected to the drain electrode, a second transparent insulating substrate, and a liquid crystal material interposed between the first and second substrate, the method comprising the steps of:

(a) forming a three layer metal film, a first under metal layer formed of a metal of good ohmic contact with the semiconductor layer, a second middle metal layer formed of a metal of high electrical conductivity, and a third upper metal layer formed of a metal having a Vickers hardness of not less than 100 withstanding cleaning with a brush;

(b) cleaning a surface of the third upper metal layer of the three layer metal film with a brush; and (c) forming the source electrode, the source electrode line and the drain electrode by patterning the three layer metal film.

11. The manufacturing method of claim 10, wherein the first lower metal layer is formed of Cr or Ti.

12. The manufacturing method of claim 10, wherein the third upper metal layer of the three layer metal film is formed of a metal of at least one member selected from the group consisting of Cr, Mo and W.

* * * * *

UNITED STATES PATENT AND TRADEMARK OFFICE
CERTIFICATE OF CORRECTION

PATENT NO.    : 6,157,430
DATED         : December 5, 2000
INVENTOR(S)   : Takeshi Kubota et al.

It is certified that error appears in the above-identified patent and that said Letters Patent is hereby corrected as shown below:

Column 21, line 39 - Column 24, Line 21,
Delete the claim section in its entirety and substitute therefore:
-- 1. A manufacturing method of a liquid crystal display device comprising a first transparent insulating substrate, a gate electrode and a gate electrode line, a semiconductor layer, a source electrode and a source electrode line, a drain electrode, a gate insulating layer formed between the gate electrode and the semiconductor layer, a pixel electrode connected to the drain electrode, a second transparent insulating substrate, and a liquid crystal material interposed between the first and second substrate, the method comprising the steps of:

(a) forming a first metal layer of high electrical conductivity metal on the first substrate;

(b) patterning the first metal layer by etching using a first resist mask having a first pattern including a pattern of the gate electrode and the gate electrode line;

(c) forming a second metal layer of high hardness metal withstanding cleaning with a brush on the first substrate and the first metal layer;

(d) cleaning the surface of the second metal layer with a brush;

(e) patterning the second metal layer by etching using a second resist mask having a second pattern covering the first pattern;

(f) etching a first metal layer left unetched outside the first etched pattern in step (b) using a two layer resist mask including the second resist mask and the second metal layer left under the second resist mask; and (g) removing the second resist mask.

2. The manufacturing method of claim 1, wherein the second metal layer is formed of a metal of at least one member selected from the group consisting of Cr, Mo and W.

3. The manufacturing method of claim 1, wherein the second metal layer is formed of a metal having Vickers hardness of not less than 100.

4. The manufacturing method of claim 1, further comprising the step of: (h) removing the second metal layer.

UNITED STATES PATENT AND TRADEMARK OFFICE
CERTIFICATE OF CORRECTION

PATENT NO.   : 6,157,430
DATED        : December 5, 2000
INVENTOR(S)  : Takeshi Kubota et al.

It is certified that error appears in the above-identified patent and that said Letters Patent is hereby corrected as shown below:

5. A liquid crystal display device comprising:
        a transparent insulating first substrate;
        a gate electrode and a gate electrode line;
        a semiconductor layer;
        a source electrode and source electrode line;
        a drain electrode;
        a gate insulating layer formed between the gate electrode and the semiconductor layer;
        a pixel electrode connected to the drain electrode;
        a transparent insulating second substrate; and
        a liquid crystal material interposed between the first and second substrates,
    wherein the source electrode, source electrode line and drain electrode are formed with a three layer metal film, a first lower metal layer formed of a metal of good ohmic contact with the semiconductor layer, a second middle metal layer formed of a metal of high electrical conductivity, and a third upper metal layer formed of a metal having a Vickers hardness of not less than 100 withstanding cleaning with a brush.

6. The liquid crystal display device of claim 5, wherein the first lower metal layer is formed of Cr or Ti.

7. The liquid crystal display device of claim 5, wherein the third upper metal layer is formed of a metal of at least one member selected from the group consisting of Cr, Mo and W.

8. The liquid crystal display device of claim 5, wherein the gate electrode and the gate electrode line are formed of a two layer metal film, a first lower metal layer of high electrical conductivity metal patterned by etching using a first resist mask having a first pattern including a pattern of the gate electrode and the gate electrode line, a second upper metal layer of high hardness metal withstanding cleaning with a brush, cleaned with a brush and patterned by etching using a second resist mask having a second pattern covering the first pattern, the first lower metal layer left unetched outside the first pattern, patterned by etching using a two layer resist mask including the second resist mask and the second metal layer left under the second resist mask.

9. The liquid crystal display device of claim 8, wherein the second upper metal layer is formed of a metal of at least one member selected from the group consisting of Cr, Mo and W.

UNITED STATES PATENT AND TRADEMARK OFFICE
CERTIFICATE OF CORRECTION

PATENT NO. : 6,157,430
DATED : December 5, 2000
INVENTOR(S) : Takeshi Kubota et al.

It is certified that error appears in the above-identified patent and that said Letters Patent is hereby corrected as shown below:

10. The liquid crystal display device of claim 8, wherein the second upper metal layer is formed of a metal, having Vickers hardness of not less than 100.

11. A manufacturing method of a liquid crystal display device comprising a first transparent insulating substrate, a gate electrode and a gate electrode line, a semiconductor layer; a source electrode and a source electrode line, a drain electrode, a gate insulating layer formed between the gate electrode and the semiconductor layer, a pixel electrode connected to the drain electrode, a second transparent insulating substrate, and a liquid crystal material interposed between the first and second substrate, the method comprising the steps of
   (a) forming a three layer metal film, a first under metal layer formed of a metal of good ohmic contact with the semiconductor layer, a second middle metal layer formed of a metal of high electrical conductivity, and a third upper metal layer formed of a metal having a Vickers hardness of not less than 100 withstanding cleaning with a brush;
   (b) cleaning a surface of the third upper metal layer of the three layer metal film with a brush; and
   (c) forming the source electrode, the source electrode line and the drain electrode by patterning the three layer metal film.

12. The manufacturing method of claim 11, wherein the first lower metal layer is formed of Cr or Ti.

13. The manufacturing method of Claim 11, wherein the third upper metal layer of the three layer metal film is formed of a metal of at least one member selected from the group consisting of Cr, Mo and W. --

Signed and Sealed this

Seventeenth Day of September, 2002

*Attest:*

*Attesting Officer*

JAMES E. ROGAN
*Director of the United States Patent and Trademark Office*